US007711699B2

(12) United States Patent
Koromyslov et al.

(10) Patent No.: US 7,711,699 B2
(45) Date of Patent: May 4, 2010

(54) METHOD AND SYSTEM FOR PRESENTING TRAFFIC-RELATED INFORMATION

(75) Inventors: Aleksandr Mikhailovych Koromyslov, Olathe, KS (US); Tommy Allen Stehle, Kansas City, MO (US); Shawn Dewayne Sohl, Lee's Summit, MO (US); Christopher James Simon, Shawnee, KS (US); Timm J. Claudon, Naperville, IL (US)

(73) Assignee: HNTB Holdings Ltd., Kansas City, MO (US)

( * ) Notice: Subject to any disclaimer, the term of this patent is extended or adjusted under 35 U.S.C. 154(b) by 364 days.

(21) Appl. No.: 11/314,607

(22) Filed: Dec. 21, 2005

(65) Prior Publication Data

US 2006/0136090 A1 Jun. 22, 2006

Related U.S. Application Data

(60) Provisional application No. 60/639,065, filed on Dec. 22, 2004, provisional application No. 60/638,920, filed on Dec. 22, 2004.

(51) Int. Cl.
*G06F 17/00* (2006.01)

(52) U.S. Cl. ..................... 707/104.1; 707/912; 701/208

(58) Field of Classification Search .................. 707/100
See application file for complete search history.

(56) References Cited

U.S. PATENT DOCUMENTS

| | | | | |
|---|---|---|---|---|
| 5,214,757 | A | 5/1993 | Mauney et al. | |
| 5,917,948 | A | 6/1999 | Holtz | |
| 5,969,973 | A | 10/1999 | Bourne et al. | |
| 6,111,539 | A * | 8/2000 | Mannings et al. | 342/357.09 |
| 6,219,696 | B1 | 4/2001 | Wynblatt et al. | |
| 6,236,933 | B1 | 5/2001 | Lang | |
| 6,426,761 | B1 | 7/2002 | Kanevsky et al. | |
| 6,574,556 | B2 | 6/2003 | Fish et al. | |
| 6,728,628 | B2 | 4/2004 | Peterson | |
| 6,745,123 | B1 | 6/2004 | Petzold et al. | |
| 6,826,473 | B1 | 11/2004 | Burch et al. | |
| 6,859,688 | B1 | 2/2005 | Orf et al. | |
| 6,967,592 | B2 | 11/2005 | Bell et al. | |
| 7,027,915 | B2 | 4/2006 | Craine | |
| 7,031,838 | B1 | 4/2006 | Young et al. | |

(Continued)

OTHER PUBLICATIONS

Houston TranStar, retrieved from the Internet Archive Wayback Machine with a publication date of Dec. 15, 2003, <http://web.archive.org/web/20031215221052/www.houstontranstar.org>.*

(Continued)

*Primary Examiner*—Mohammad Ali
*Assistant Examiner*—Syed H Hasan
(74) *Attorney, Agent, or Firm*—Shook, Hardy & Bacon, LLP

(57) ABSTRACT

Presenting of real-world situational data on a dynamically updateable user interface is provided for by providing a dynamically updateable user interface that includes dynamic objects having variable characteristics and that correspond to real-world objects, receiving situational data that corresponds to a status of the one or more real-world objects, and conforming the one or more variable characteristics to be consistent with the situational data such that an observer of the one or more dynamic objects is informed of a current status of a corresponding real-world situation.

22 Claims, 19 Drawing Sheets

U.S. PATENT DOCUMENTS

| | | | | |
|---|---|---|---|---|
| 2001/0022862 | A1 | 9/2001 | Alm | |
| 2001/0024203 | A1 * | 9/2001 | Yamada et al. | 345/428 |
| 2001/0030667 | A1 * | 10/2001 | Kelts | 345/854 |
| 2002/0083331 | A1 | 6/2002 | Krumel | |
| 2002/0158922 | A1 * | 10/2002 | Clark et al. | 345/864 |
| 2002/0198694 | A1 | 12/2002 | Yang et al. | |
| 2004/0008225 | A1 | 1/2004 | Campbell | |
| 2005/0064936 | A1 | 3/2005 | Pryor | |
| 2006/0074544 | A1 | 4/2006 | Morariu et al. | |

OTHER PUBLICATIONS

U.S. Appl. No. 11/313,520, non-Final Office Action, Mailed Sep. 26, 2008.

U.S. Appl. No. 11/313,520, Final Office Action, Mailed Apr. 02, 2009.

U.S. Appl. No. 11/313,520, non-Final Office Action, Mailed Sep. 24, 2009.

U.S. Appl. No. 11/316,567, non-Final Office Action, mailed Sep. 20, 2007.

U.S. Appl. No. 11/316,567, Final Office Action, mailed Mar. 27, 2008.

U.S. Appl. No. 11/316,567, Notice of Allowance, mailed Nov. 17, 2008.

Patent Cooperation Treaty (PCT) International Search Report, Sep. 24, 2008, 8 pps.

* cited by examiner

322

318

320

362

METHOD AND SYSTEM FOR PRESENTING TRAFFIC-RELATED INFORMATION

CROSS-REFERENCE TO RELATED APPLICATIONS

This Application claims the benefit of U.S. Provisional Application No. 60/639,065 and 60/638,920, both filed on Dec. 22, 2004, and incorporated by reference herein. This Application is also related by subject matter to the disclosure of the following three copending and commonly assigned applications (each of which is incorporated by reference herein) that were filed on even date herewith: 1) GEOMETRY CREATION TOOL Ser. No. 11/313,520; 2) COMMUNICATION OF PROJECT INFORMATION Ser. No. 11/316,135; and 3) RETRIEVING AND PRESENTING DYNAMIC TRAFFIC INFORMATION Ser. No. 11/316,567.

STATEMENT REGARDING FEDERALLY SPONSORED RESEARCH OR DEVELOPMENT

Not applicable.

BACKGROUND

Many projects of various sorts are completed using drawings, specifically computer-aided drawings (CAD). While CAD drawings offer various advantages, they are nevertheless, stagnant. That is, they do not depict any more information than what is shown to the user. They are not dynamic and do not include any sort of intelligence.

But dynamic user interfaces and user interfaces that intelligently change based on various conditions are desirable in various settings. Historically, drawings have been tangentially useful at best in attempting to create a dynamic user interface. And even if a dynamic interface could be created, a problem of updating the user interface would still persist. That is, reconciling changes made to a drawing with those that ought to be reflected in a corresponding dynamic interface has been a difficult, resource intensive, and expensive process, if possible at all. The current state of the art could be advanced by providing, among other things, an efficient method for using the data in a CAD drawing to generate a dynamically updateable user interface. And the art could further be advanced by providing a method for dynamically updating a user interface that includes geometry information to present situational data associated with real-world events, and one that can be automatically regenerated consistent with changes made to a CAD drawing associated with the user interface.

SUMMARY

The presenting invention is defined by the claims below. Embodiments of the present invention solve at least the problems mentioned above and are directed to solving other problems discussed herein. The invention is defined by the claims that appear at the end of this document.

In a first illustrative aspect, a set of computer-useable instructions provide for the presentation of real-world situational data on a dynamically updateable user interface by providing a dynamically updateable user interface that includes dynamic objects having variable characteristics and that correspond to real-world objects, receiving situational data that corresponds to a status of the one or more real-world objects, and conforming the one or more variable characteristics to be consistent with the situational data such that an observer of the one or more dynamic objects is informed of a current status of a corresponding real-world situation.

In a second illustrative aspect, a method for presenting real-world situational data on a dynamically updateable user interface is provided. The method includes depicting on a system-independent graphical user interface graphical objects that have variable characteristics; storing in a repository, object-rendering data that describes how to render the graphical objects; receiving from traffic-data gathering components traffic data that describes a status of a real-world, traffic-related situation; communicating the traffic data to the graphical objects; causing the one or more variable characteristics respectively associated with the graphical objects to graphically indicate the status of the current traffic-related situation; and without user interaction, periodically determining whether the object-rendering data in the repository has changed from a previous state to subsequent state, and if so, automatically re-depicting the graphical objects consistent with the subsequent state. When we refer to "periodically" determining, we do not mean to imply that the determining step is limited to occurring at fixed time intervals. Rather, this might occur on an irregular schedule, or might be triggered based on the happening of one or more events.

In a third illustrative aspect, a computer-program product provides for facilitating a method for presenting real-world situational data on a dynamically updateable user interface. The method includes creating a dynamically updateable user interface (UI) that includes depictions of dynamic objects that correspond to the attribute-receivable objects and that are associated with variable characteristics; receiving situational data; and conforming the one or more variable characteristics incident to receiving situational data.

In a final illustrative aspect, a method for presenting traffic-related information is provided that includes gathering a set of informational attributes associated with traffic conditions of a geographic area, and representing the informational attributes on a graphical user interface.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
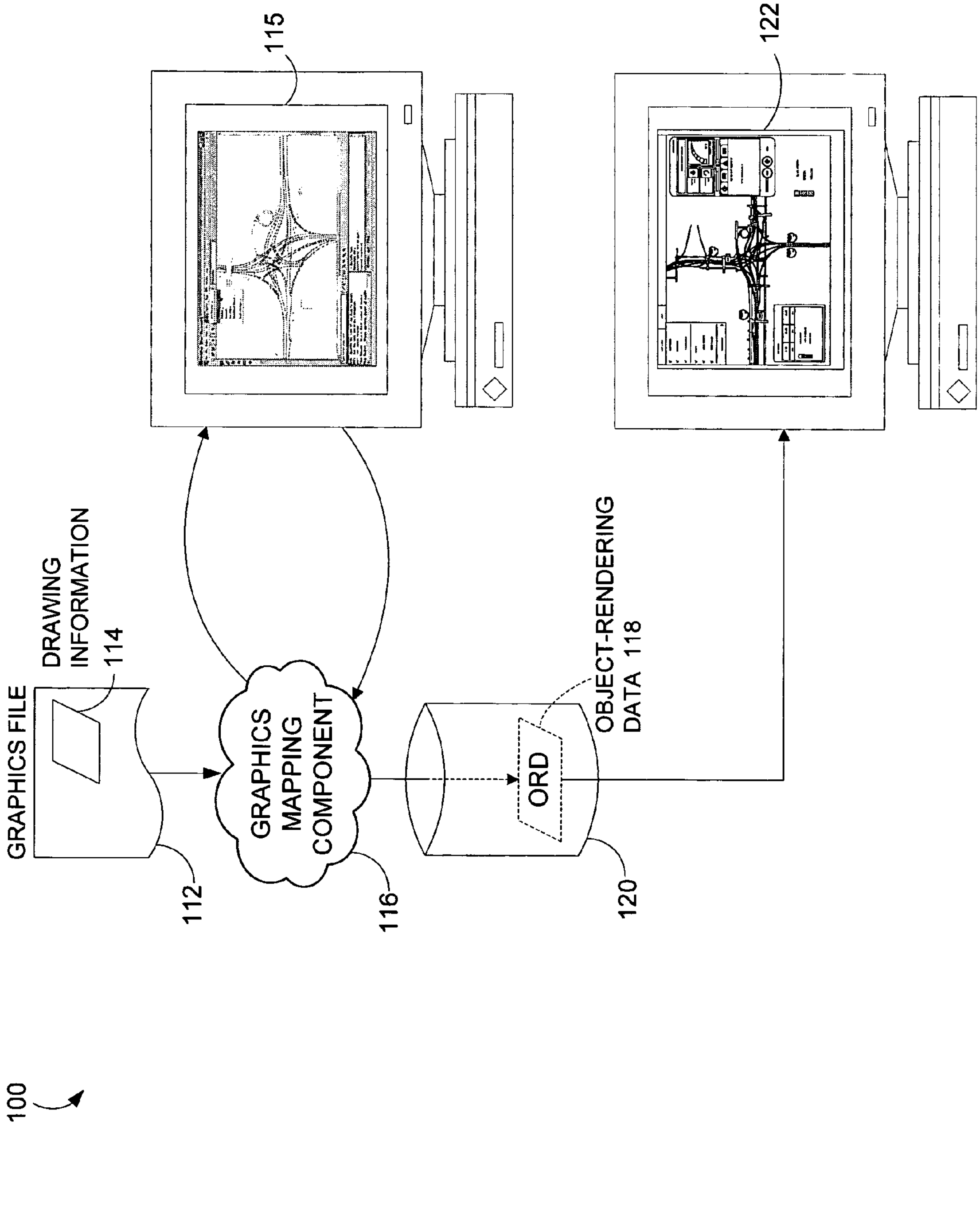
FIG. 1 is a combination block/flow diagram that illustrates a high-level overview of mapping a stagnant drawing and producing a dynamically updatable user interface in accordance with an embodiment of the present invention.

One aspect of the present invention includes a graphic utility application that creates graphic symbology of architectural and civil engineering project data. Graphic data which may represent existing or proposed site layouts, buildings, roadways, or other structures and can be sequenced into hierarchal groups, logical construction steps tied to a lifeline, etc. Relational data, such as object-rendering data, is built from the sequenced data and imported into a database and transmitted to an application for display (which will be described below in greater detail in connection with FIGS. 4A, 4B, and 5).

Graphic primitives (polylines, polygons, text, points, etc.) can be created or imported from third-party CAD programs and the like. Attribute information is attached to each type of graphic primitive to aid in organizing each individual primitive. A flexible set of container objects is used to group or sequence these primitives into logical or hierarchal order. The design of these container objects allows a user to create logic diagrams, traffic routes, construction sequences, etc. In one embodiment, SQL script exports relational data, such as object-rendering data 118, for import into a database or data is communicated to a dynamically updateable user interface that updates according to changes in situational data associated with one or more real-world projects.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CAD Computer Aided Drafting

DXF Extension for AUTOCAD files

DGN Extension for MICROSTATION files

SVG Extension for general vector-based graphics file

GIS Global Information System

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Generic Mapper

Turning now to FIG. 1, a high-level overview of a method in accordance with an embodiment of the invention for developing an information-presenting interface from a drawing is provided and referenced generally by the numeral 100. A graphics file 112 includes drawing information 114. In one embodiment of the invention, graphics file 112 is a vector-based graphics file. Illustrative vector-based graphics files include those with a .DXF extension ("AutoCAD" type files), .DGN ("MicroStation" type files), and .SVG files. Those skilled in the art will readily appreciate the nature of the aforementioned files including their illustrative aspect and that various other types of vector-based graphics files exist, which are equally useable in connection with the present invention.

Graphics file 112 is a file that depicts a drawing, and includes drawing information 114, which instructs a rendering device how to render the stagnant drawing. Drawing information 114 may, for example, include indications of the coordinates of various types of drawing objects such as lines, curves, shapes, etc.

Graphics file 112 is received by a graphics mapping component 116, which uses drawing information 114 to produce a redrawn map 115 and to ultimately export object-rendering data 118 that can be used to render a dynamically updateable user interface 122. An illustrative method carried out by graphics mapping component 116 will be discussed in greater detail with referenced to FIG. 2 below, and also in connection with FIGS. 3A-3N. In one embodiment, graphics mapping component 116 takes the form of an software application embodied on one or more computer-readable media that exposes rich functionality to derive the set of attribute-receivable objects that can receive attributes.

The attributes can subsequently be leveraged in connection with dynamically updating user interface 122 based on happenings in some external environment (such as the completion of a building, a traffic situation, or any other of a myriad of possibilities). User interface 122 is depicted in accordance with graphics file 112 (or multiple graphics files—not shown so as to not obscure the present invention). As mentioned, the nature of an embodiment of graphics mapping component 116 will be explained in greater detail with reference to several screen shots in FIGS. 3A-3N.

Database 120 can assume a variety of forms, as long as it can store parsed data and be used to expose that data to one or more accessing applications.

Object-rendering data 118 can then be used to generate a dynamic user interface 122, having objects with characteristics that can be varied according to varying situational data that varies with situations occurring in the real world. Details regarding dynamic interface 122 will be provided in connection with FIGS. 4A-4C.

Figure 2:
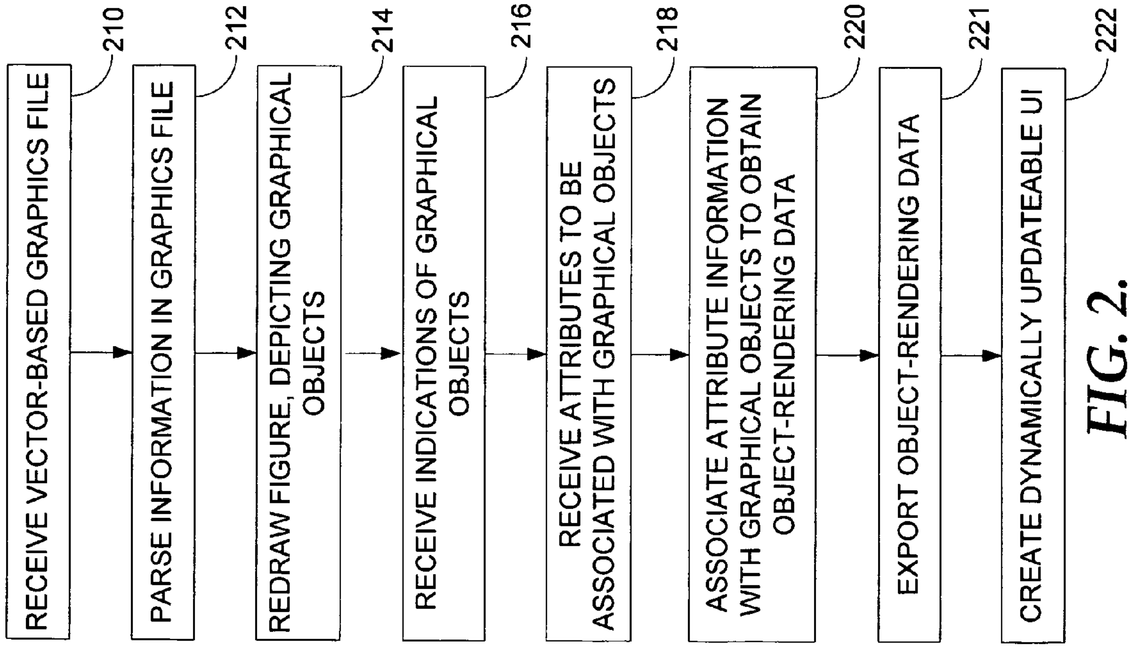
FIG. 2 is a flow diagram that depicts an illustrative method carried out by graphics-mapping component 116 in accordance with an embodiment of the present invention.

Turning now to FIG. 2, an illustrative method for developing an information-presenting interface from a drawing is provided. In one embodiment, this method is carried out by graphics mapping component 116. At a step 210, graphics file 112 is received. In one embodiment, this step is accomplished by navigating to the specific graphics file and then opening it. At a step 212, certain portions of drawing information 114 are parsed. For example, drawing information 114 will often include coordinate data that describes various objects in graphics file 112.

If, for example, graphics file 112 were of a mushroom, then certain portions of drawing information 114 would describe (in various ways) a polygon that makes up the stem and another shape that makes up the mushroom cap. The stem may be a polygon composed of four segments and five points. One illustrative method that graphics mapping component 116 can employ to determine that the stem itself is an object is by observing that the starting point is the same as the ending point. Similar methods can be employed in connection with the mushroom cap. All of aspects drawing 112 are described by drawing information 114.

In one embodiment of the present invention, graphics file 112 is drawn according to a practice method such that objects that are supposed to be closed do in fact have the same starting and ending point. This makes identifying such objects as closed objects easier. One of the purposes for parsing information 114 is to be able to ultimately create another representation of graphics file 112, wherein the subsequent rendition includes objects that can be selected and have attributes associated with them.

Thus, at a step 214, the figure(s) of graphics file 112 is redrawn, and depicted by graphical objects using object-rendering data 118 that was outputted from graphics mapping component 116 incident to being parsed at a step 212. A wide array of data can be gleaned from drawing information 114. For example, if the drawing were of a layout, things such as building outlines, bridges, parks, rail lines, property lines, site plans, subsurfaces or any type of civil data can be associated with attributes. When the redrawn map 115 is produced in step 214, it includes a variety of attribute-receivable objects.

Illustrative attribute-receivable objects include points, text, lines, polygons, images, other objects, or groupings, etc. Coordinate geometry information that existed in graphics file 112 can ultimately be produced in redrawn map 115 in step 214. The present invention allows proprietary coordinate data to be transformed into a universal mapping system. This process of redrawing the figure described by drawing information 114 is accomplished automatically and without user intervention.

At a step 216, indications defining graphical objects are received. In one embodiment, this is accomplished by presenting a user interface that presents redrawn map 115 and exposes a set of options to associate one or more attributes with the constituent objects that compose the redrawn figure. These attributes are received at a step 218 and actually associate it with the various graphical objects. The attribute information is then associated at a step 220 with the graphical objects to obtain object-rendering data 118.

At a step 221, object-rendering data 118 is exported to database 120. Exportation does not need to occur as a single action. In an alternative embodiment, portions of object-rendering data 118 can be exported as it is received. Object-rendering data 118 can then be used to create dynamically updateable user interface 122 (see also FIGS. 4A & 4B), which is accomplished at representative step 222, and will be explained in greater detail below.

Summarily, dynamically updateable user interface 122 uses object-rendering data 118 to determine how to render the objects that it presents on a user interface. Accordingly, as data 114 changes in graphics file 112, object-rendering data 118 is updated, allowing the structure of the dynamically updateable user interface to automatically be re-rendered without user intervention. An illustrative process for mapping a graphics file such as graphics file 112 into object-rendering data 118 will not be described.

Figure 3A:
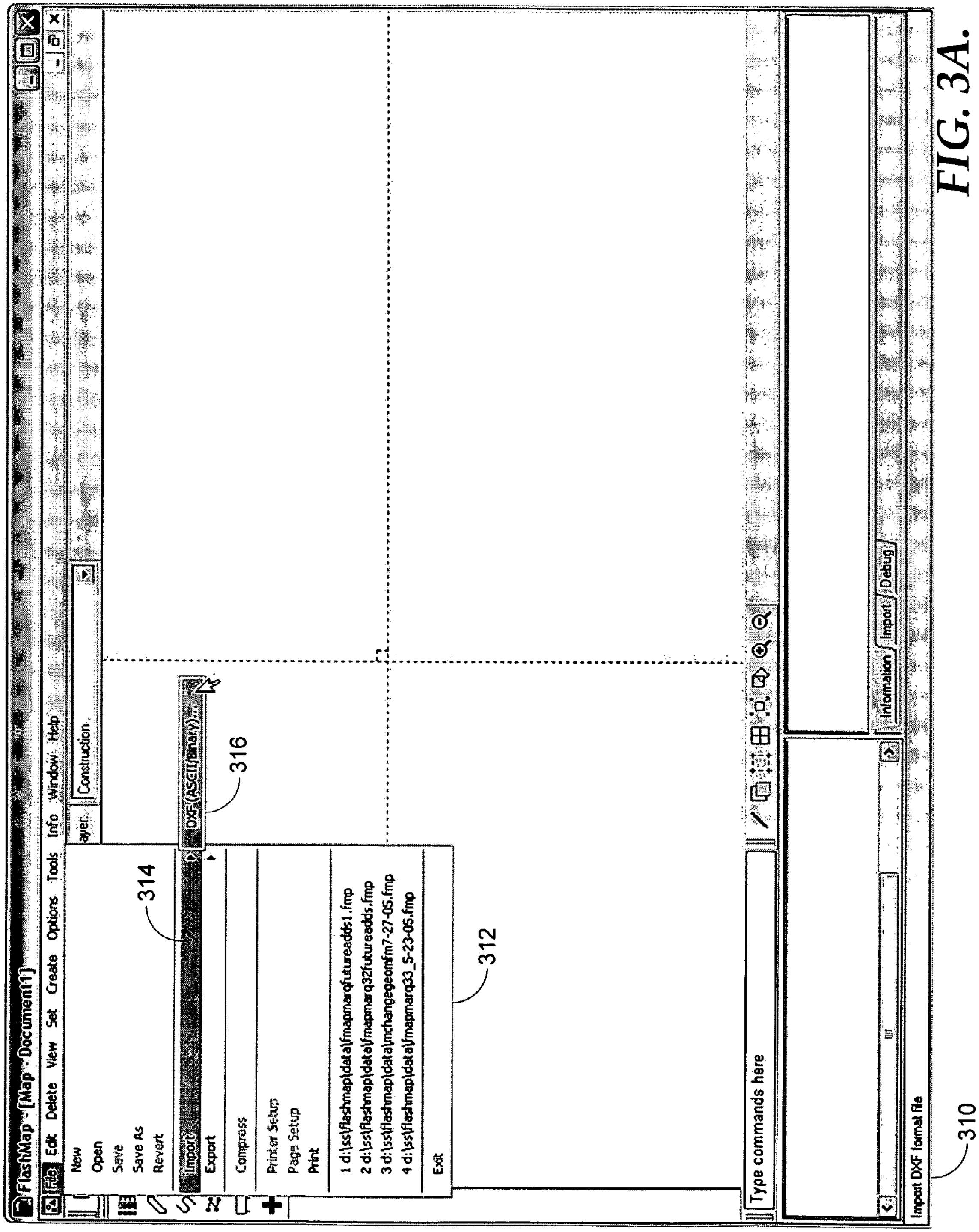
FIGS. 3A-3N are screen shots of one embodiment of graphics-mapping component 116 in accordance with an embodiment of the present invention.

Turning to FIG. 3A, a screenshot of an introductory screenshot of a screen of graphics mapping component ("GMC") 116 is provided and referenced by numeral 310. Screenshot 310 illustrates an array of functional aspects offered by GMC 116. These functional aspects are self-described by FIG. 3A. For example, several menu items such as "file," "edit," "delete," "view," "set," "create," "options," "tools," "info," "window," and "help," are various menu items that expose various functional aspects of GMC 116.

Figure 3C:
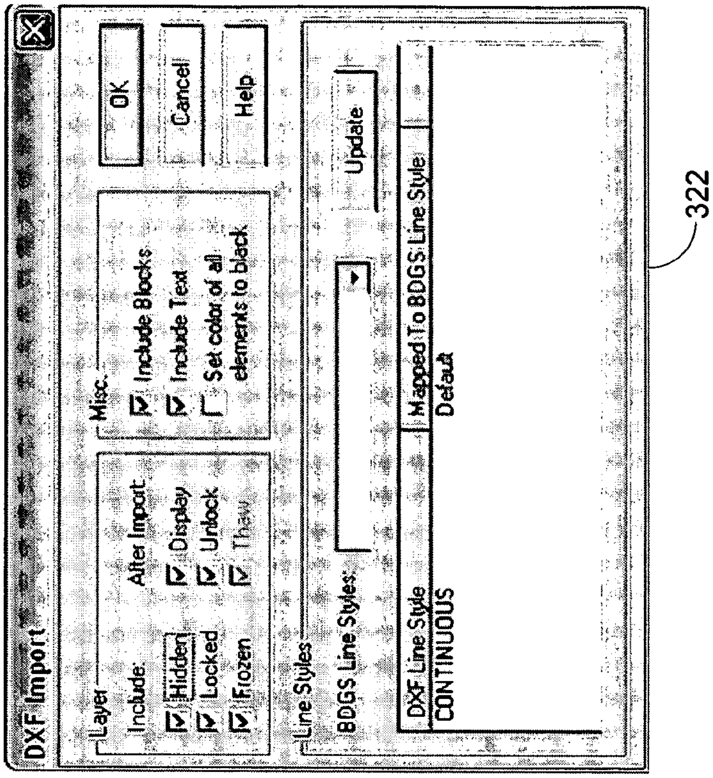
Figure 3B:
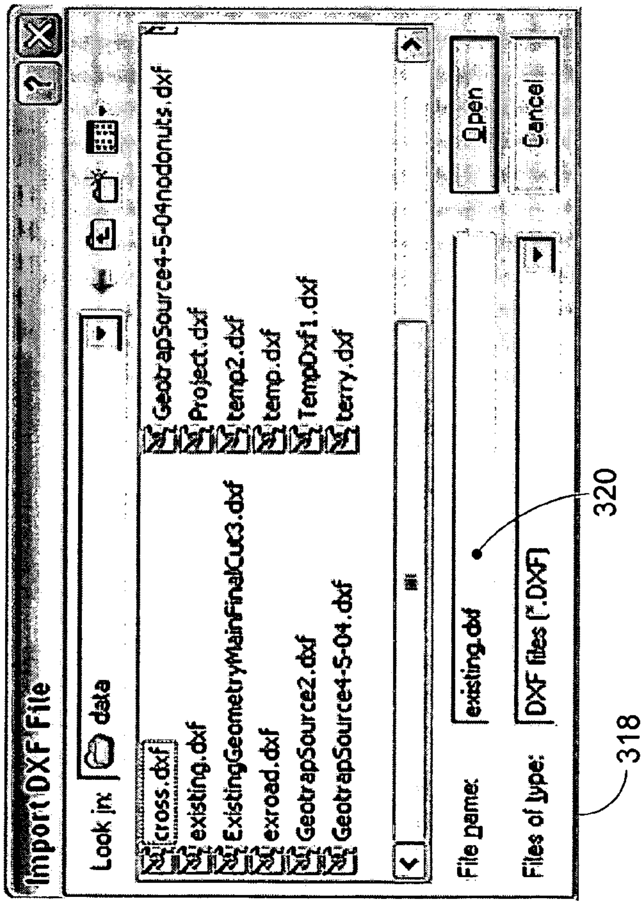

As shown, a dropdown menu 312 offers an import function represented by numeral 314. A displayed option 316 is shown as an option to import a .DXF file. As previously mentioned, a .DXF file is an illustrative type of vector-based graphics file. Selecting option 316 presents the screenshot of FIG. 3B, referenced by numeral 318. This is one way to receive graphics file 112, which was described in connection with step 210. Either automatically or by a user, a desired location of a desired file is navigated to and a specific file is selected. Its corresponding name is presented in textbox 320. Selecting the "open" button on screenshot 318 presents an illustrative screenshot 322, as shown in FIG. 3C.

Screenshot 322 exposes options associated with layers of what will be the redrawn mapped FIG. 324 (referred to hereafter as "map"), and other miscellaneous options such as whether to include blocks, text or to set the color of all elements to a certain color, such as black. Line styles can also be defined using the components of screenshot 322. Selecting the "OK" button of screenshot 322 triggers the step 212 of FIG. 2, wherein the information in graphics file 112 is parsed.

Figure 3D:
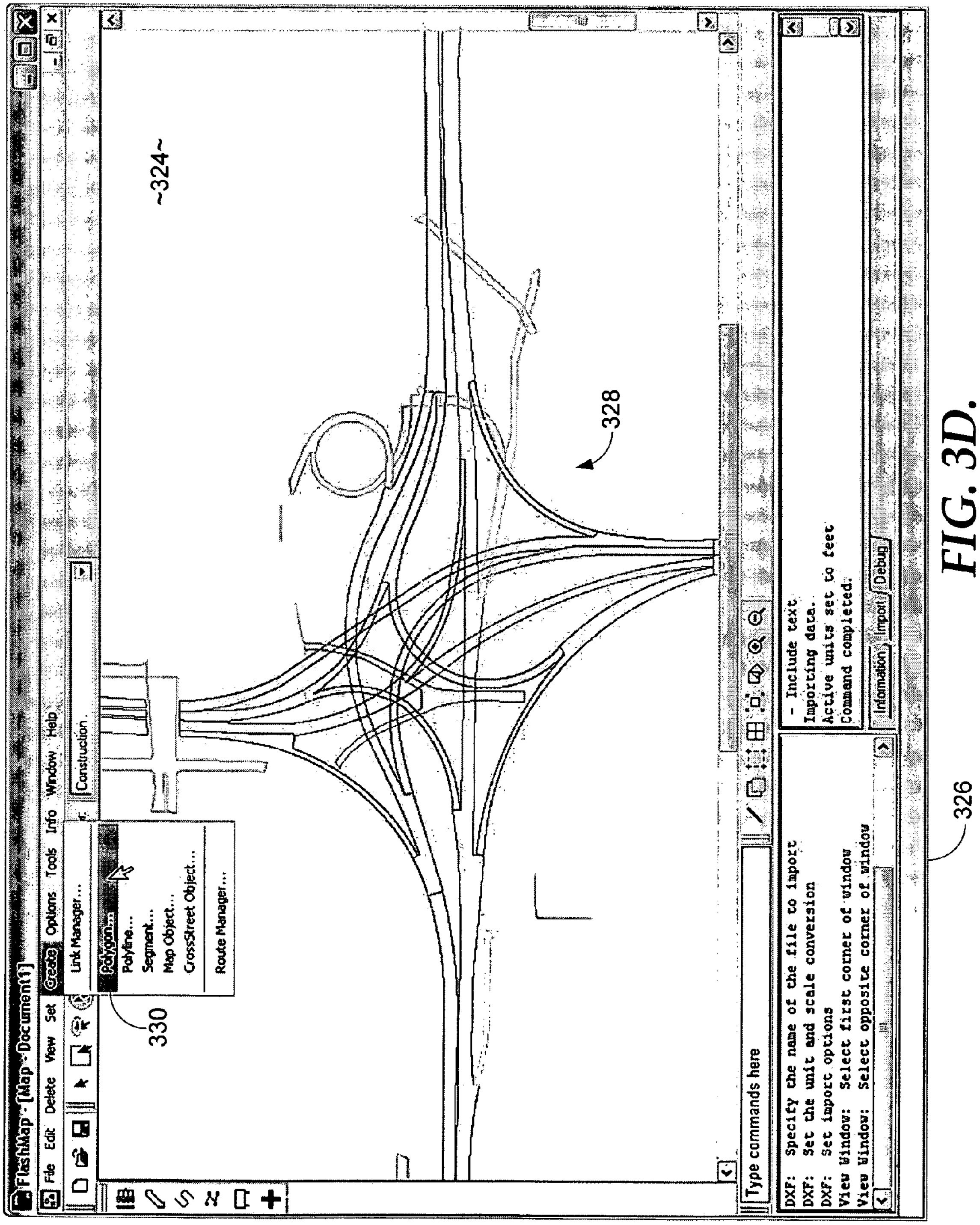

As drawing information 114 is parsed, GMC 116 is able to identify and reconstruct various objects on a redrawn map 324, illustrated in screenshot 326 of FIG. 3D. For this example, an illustrative figure representing a traffic interchange is shown. The present invention, however, should not be construed as limiting to the type of image illustratively shown, for example a traffic-related image. Such an image is shown so as to be able to illustrate various functional aspects associated with the invention.

The attribute-receivable objects are represented generally by the numeral 328, and here, include various representations of objects that correspond to original objects in graphics file 112. But the objects 328 in redrawn map 326 can be defined and then associated with attributes that can be leveraged to redraw a final map (such as that of FIG. 4A), which is dynamically updateable according to varying situational data in the real world.

Figure 3E:
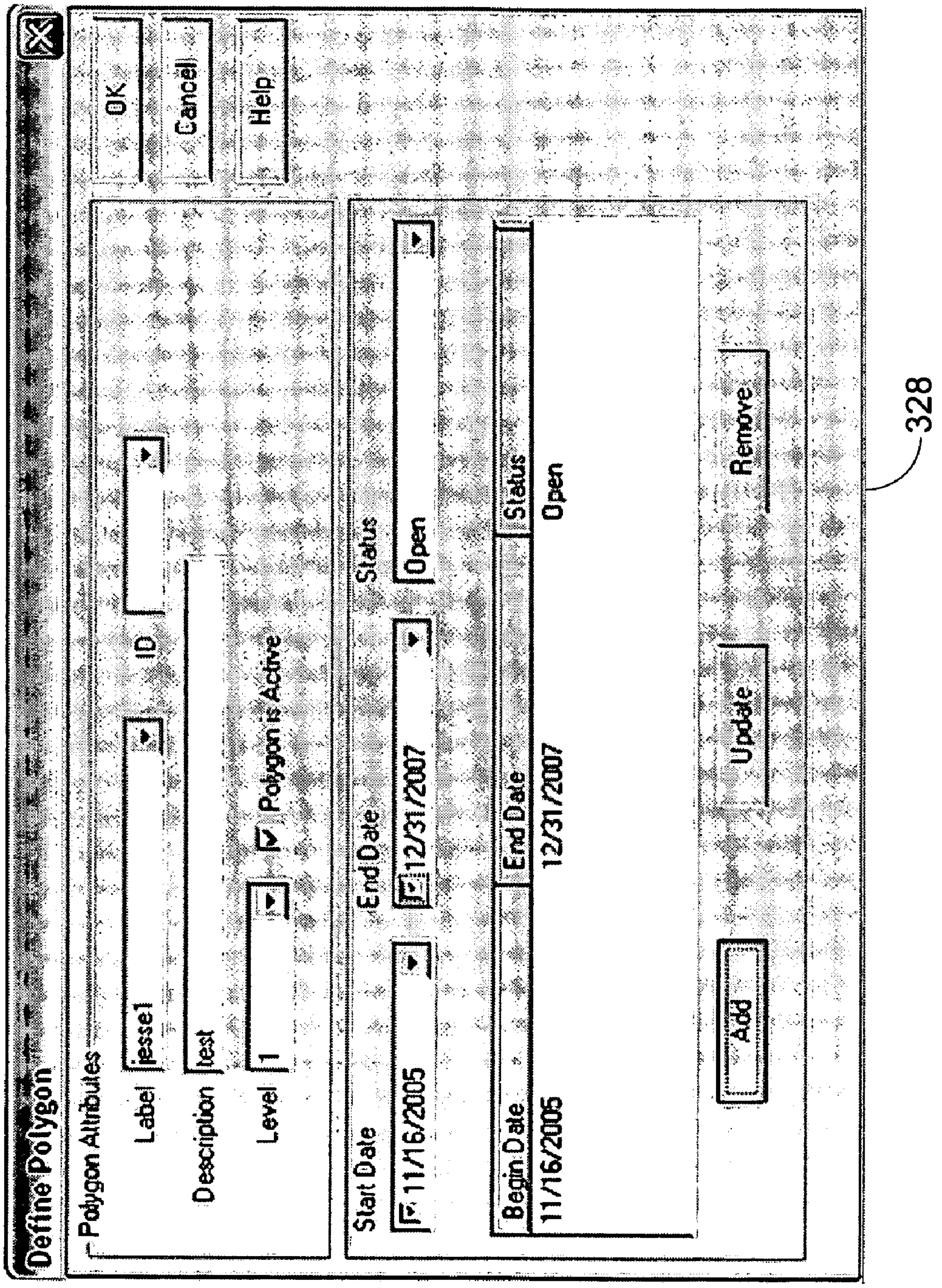

According to one method of the present invention, polygons can be defined, and then segments can be defined as groups of polygons, and then routes can be defined as groups of segments. Other groupings can also occur, but these would are shown to as illustrative. As shown in FIG. 3D, a dropdown menu exposes a "polygon" link 330 that, if followed, presents a user with the screenshot of FIG. 3E, referenced by numeral 328. Per screenshot 328, a unique label, identifier, and a description can be entered to be associated with the polygon selected. Other attributes such as "start date," "end date," and "status," can be assigned at this time in this embodiment. After these parameters are populated, a user can select the "OK" button of FIG. 3E, which will present a modified redrawn map referenced by numeral 330 in a screenshot 332 of FIG. 3F.

Figure 3F:
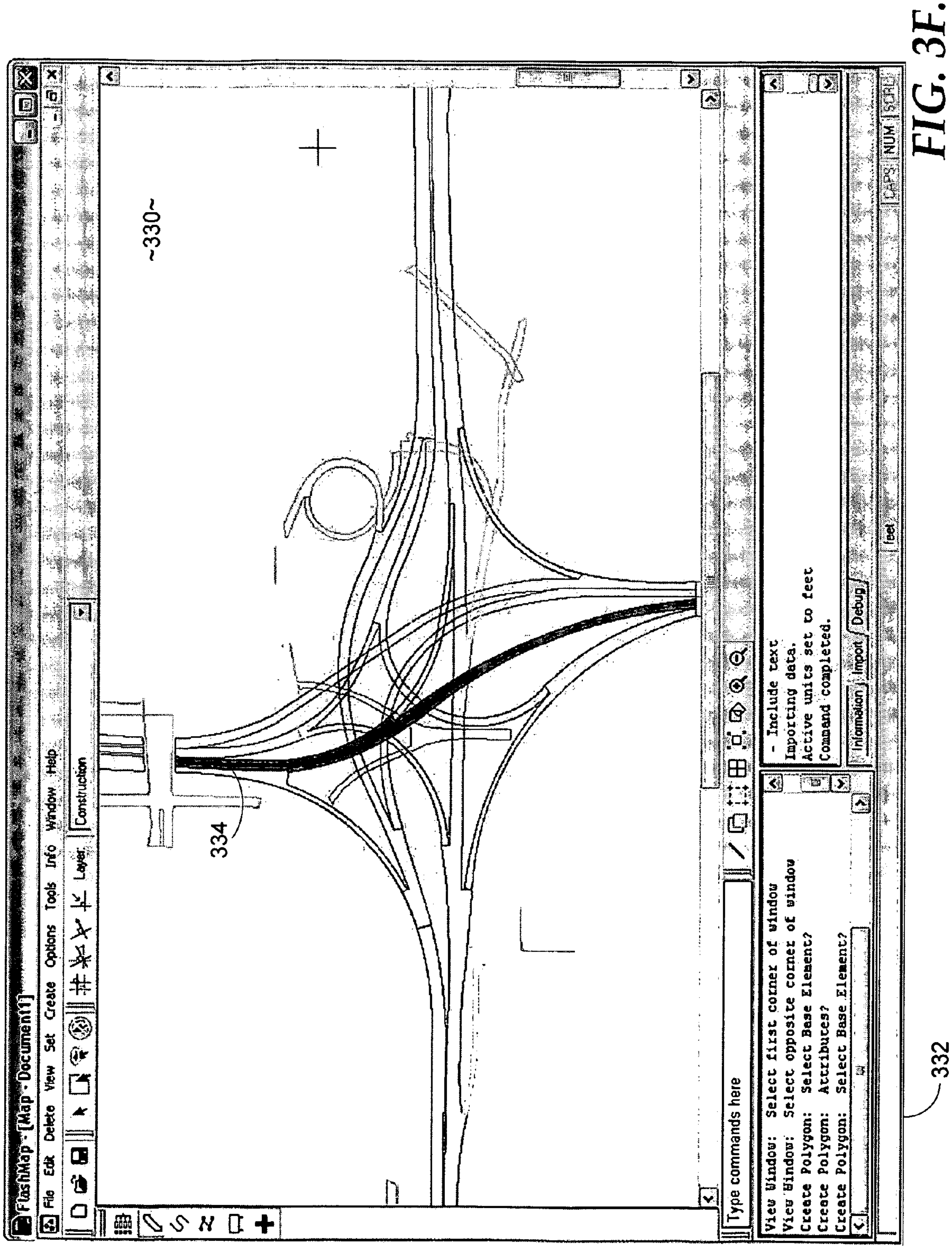

In FIG. 3F, a defined polygon 334 is shown as shaded, having a fill, or somehow otherwise designated to having been defined. Thus, screenshot 332 shows the results of a created polygon, which is referenced by numeral 334. This procedure could be repeated for as many objects as are desired to be defined as polygons. With defining objects as polygons (and later as segments, routes, etc.), the defined objects can be associated with characteristics that will vary according to corresponding variations in real-world situations.

Figure 3G:
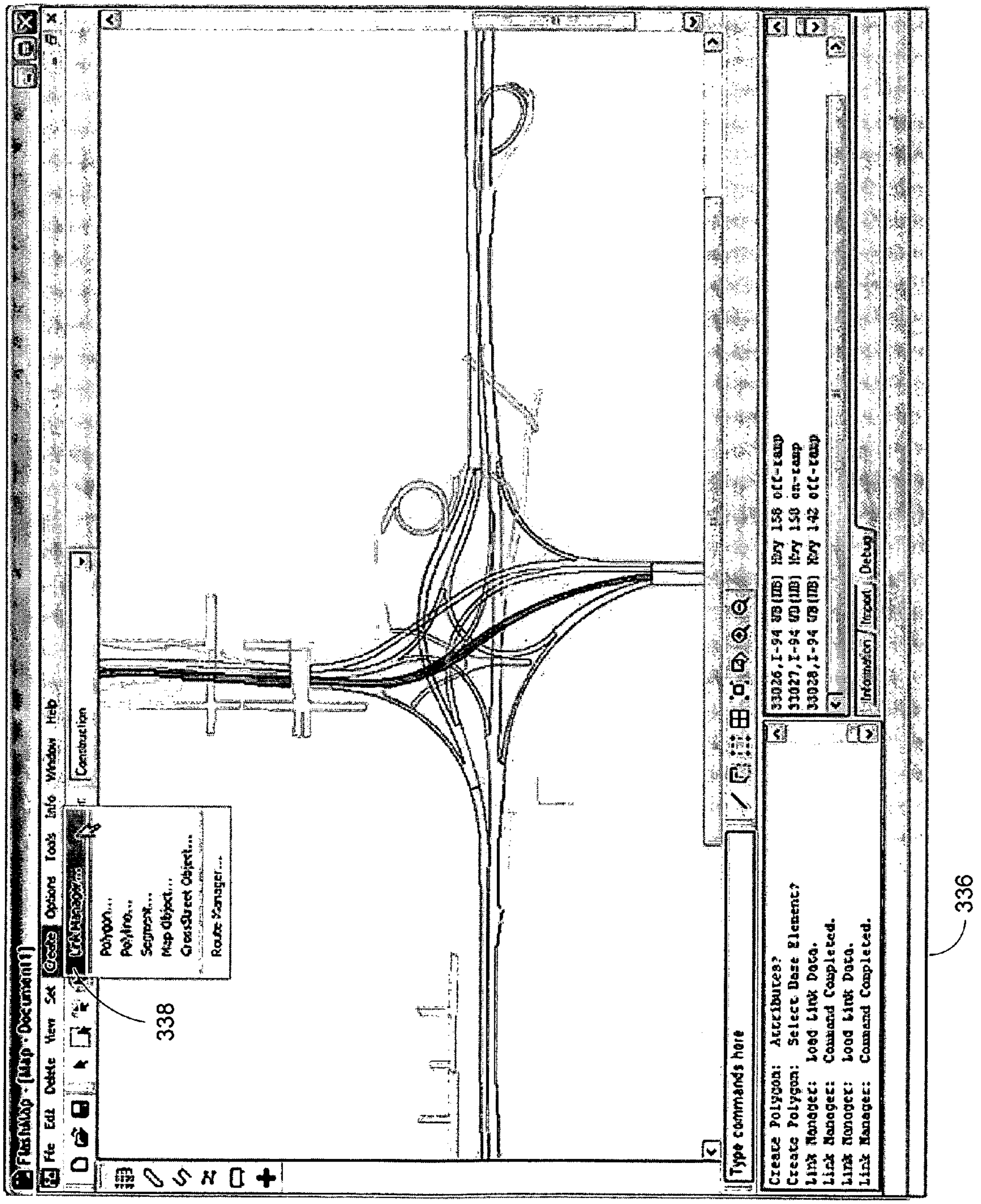
Figure 3H:
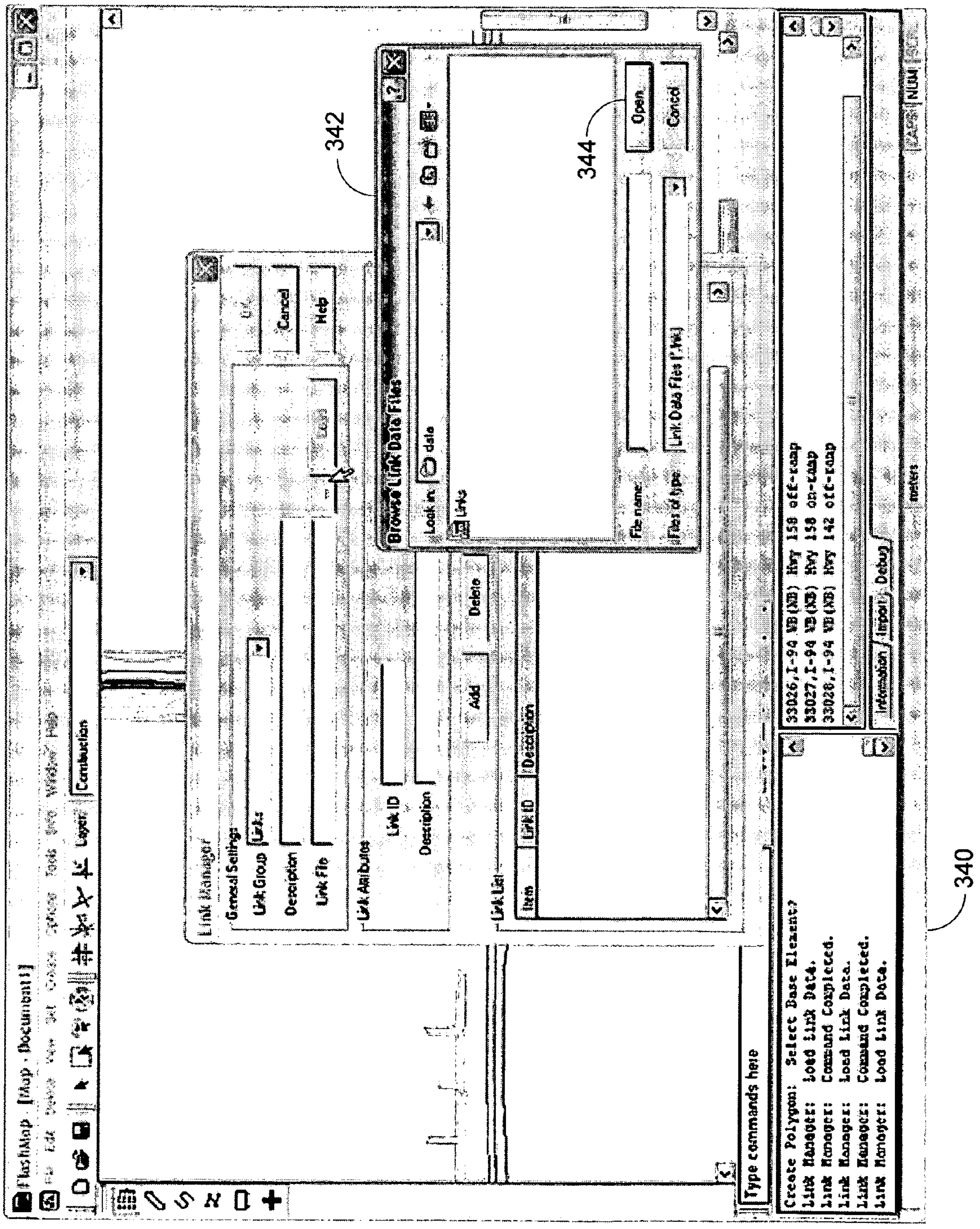

Continuing with the object-designation process per FIG. 3G, a screenshot 336 depicts a link-manager option 338 that allows a link table to be created, which in one embodiment begins to allow real-world information to be associated with defined objects. In FIG. 3H, a screenshot 340 depicts a "Browse Link Data Files" dialog box 342 that allows a user or other program to navigate to a location where a desired link data file is stored. Using linked data is one way to facilitate grouping of objects.

Figure 3I:
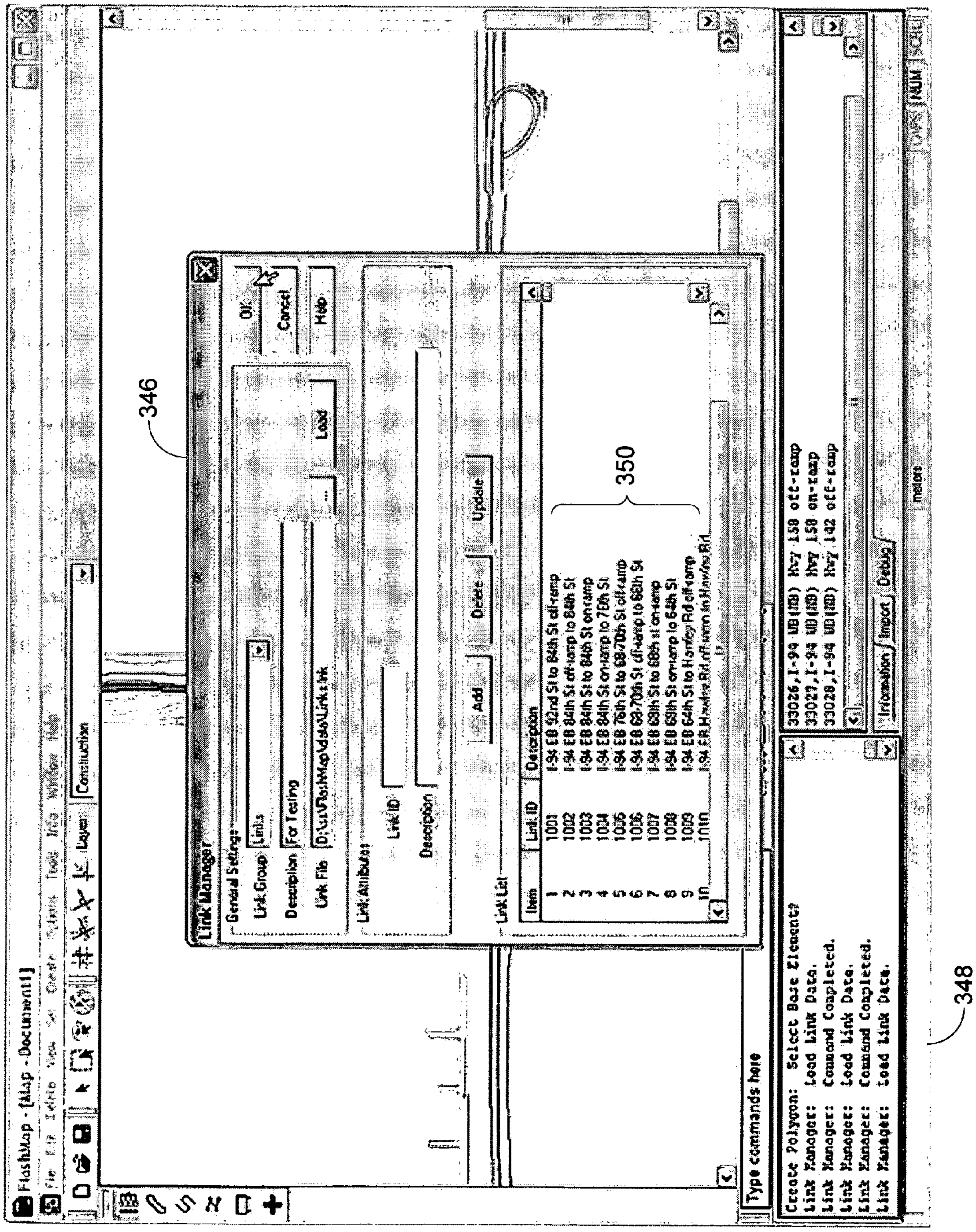

Upon selecting an "open" button 344, a user is presented with a link-manager dialog box 346 as shown in screenshot 348 of FIG. 3I. As can be seen, aspects of external data 350 can be associated with the defined objects of the redrawn map. The illustrative external data 350 shown includes the description of various traffic or routing information associated with real-world objects that will be meaningful to the objects of the redrawn map.

Figure 3J:
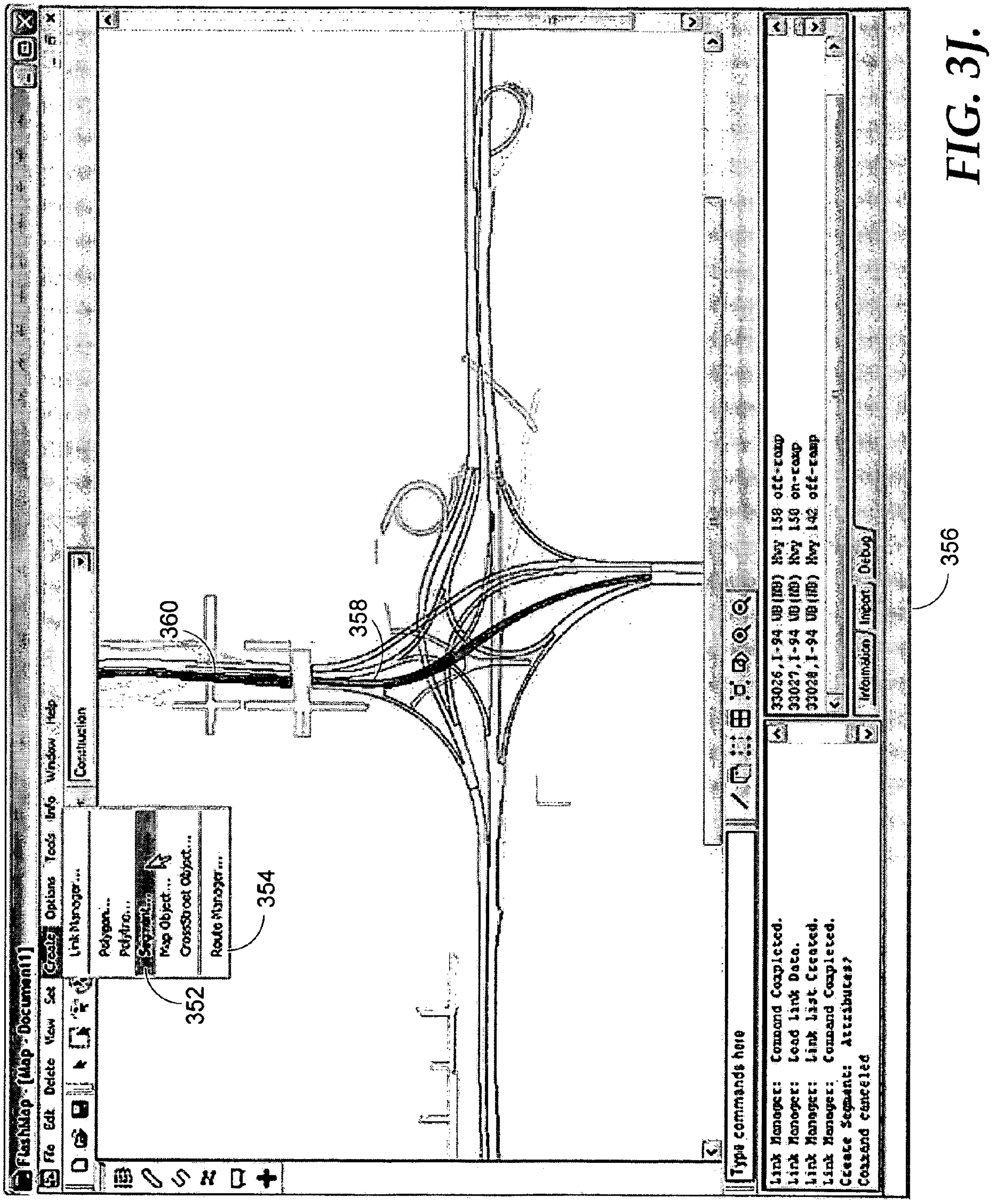

Turning to FIG. 3J, a "segment" command 352 is exposed via a dropdown window 354 of screenshot 356. In one embodiment, a segment may be created as a combination of polygons. As shown, a first illustrative polygon 358 and a second illustrative polygon 360 are shown to be grouped as a segment.

Figure 3K:
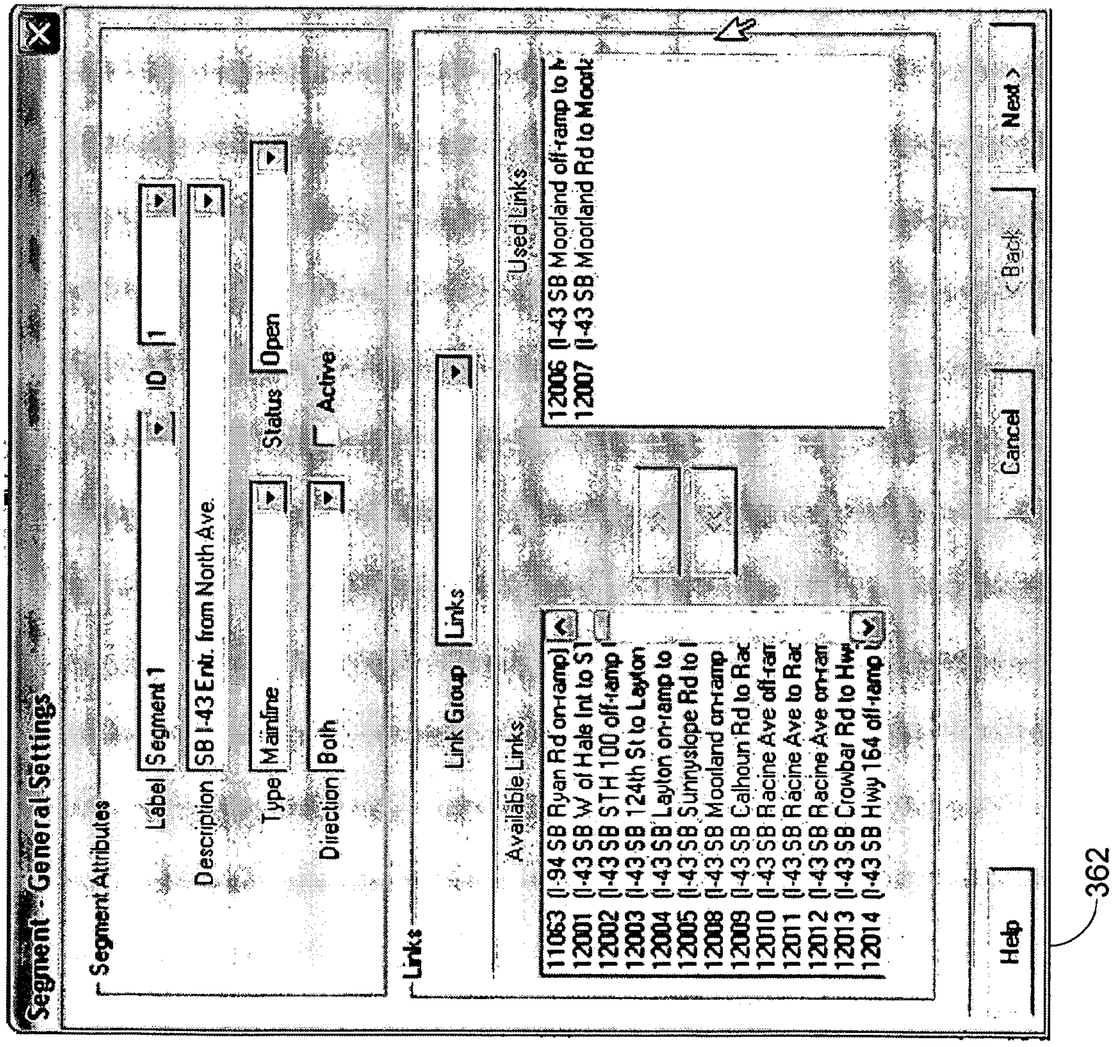

Screenshot 362 of FIG. 3K depicts general settings associated with defining a segment from two or more polygons. A label, identifier, description, type, status, direction, and indication of activity can be selected via the various controls depicted in screenshot 362. Available links are also presented to be selected as used links.

Figure 3L:
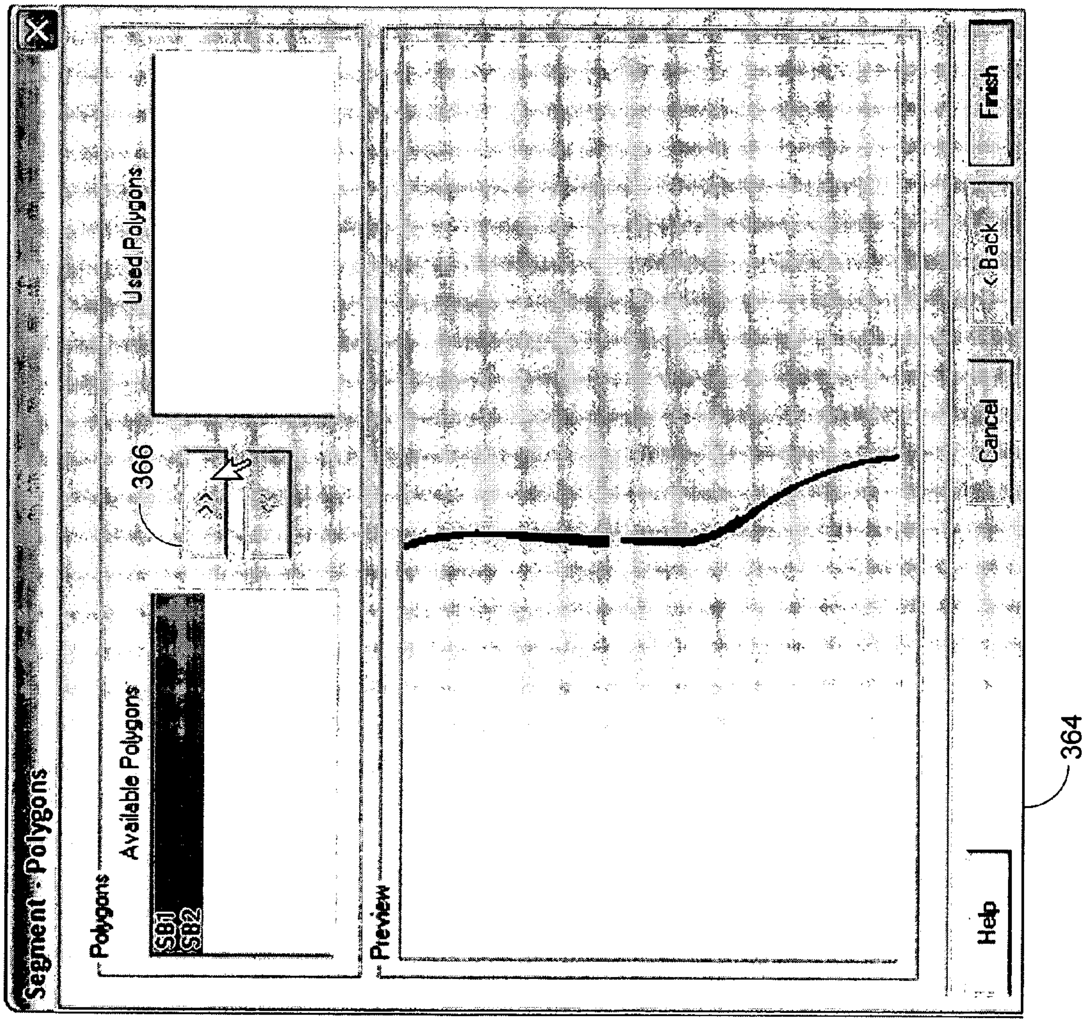
Figure 3M:
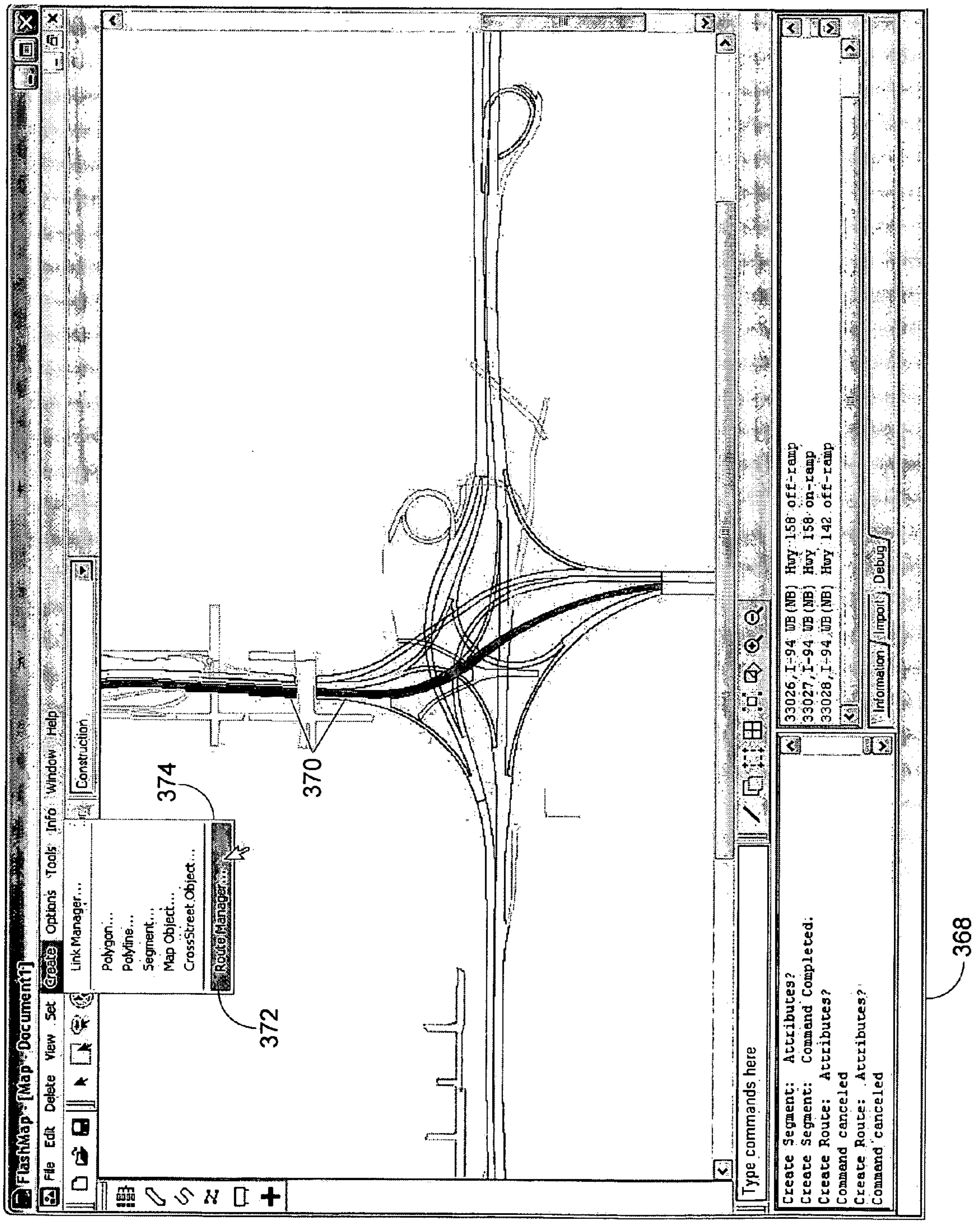
Figure 3N:
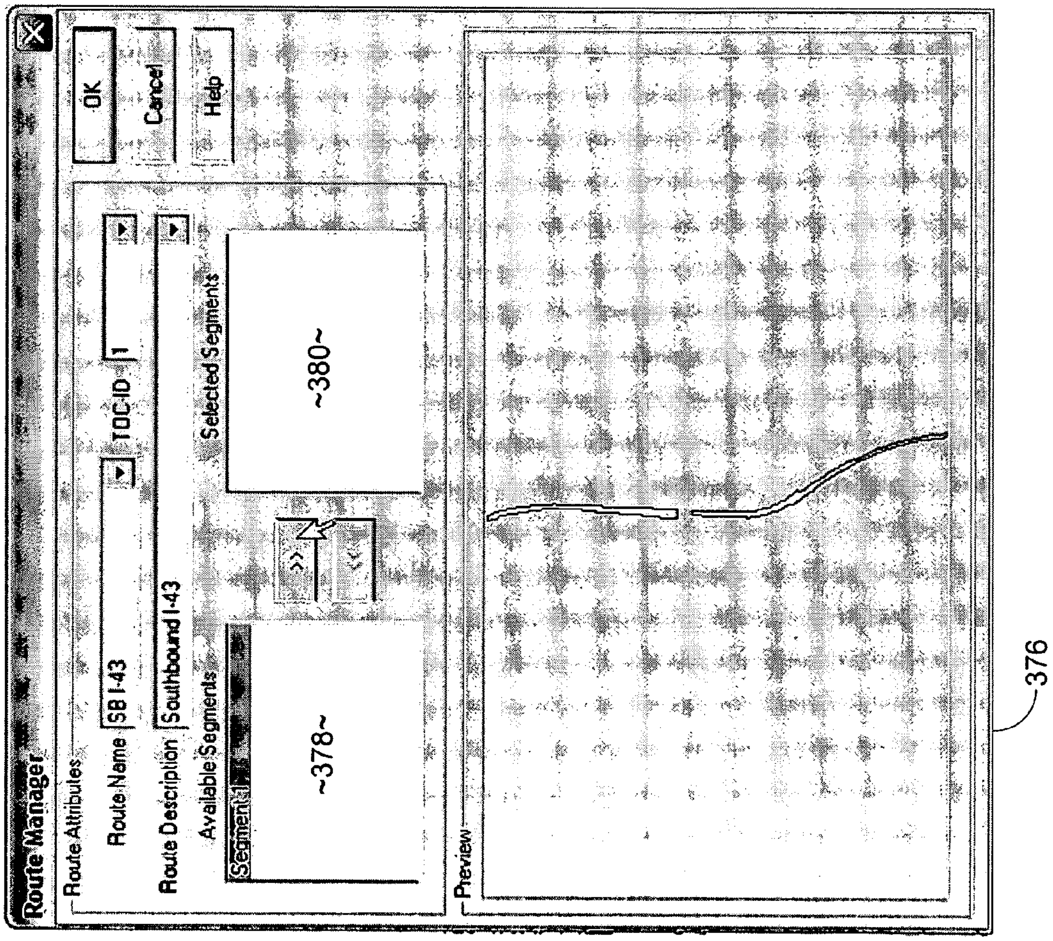

In FIG. 3L, a screenshot 364 illustrates how available polygons can be used to define a segment. As shown, polygons named "SB1," and "SB2" are available and will be designated to be used polygons by clicking control 366. Selecting the "finish" button of FIG. 3L presents a screenshot 368 of FIG. 3M that shows a newly created segment referenced by numeral 370. This process can be repeated for as many segments that are to be joined. Those of ordinary skill in the art will be able to appreciate the immense flexibility and functional aspects offered by the present invention.

Figure 4A:
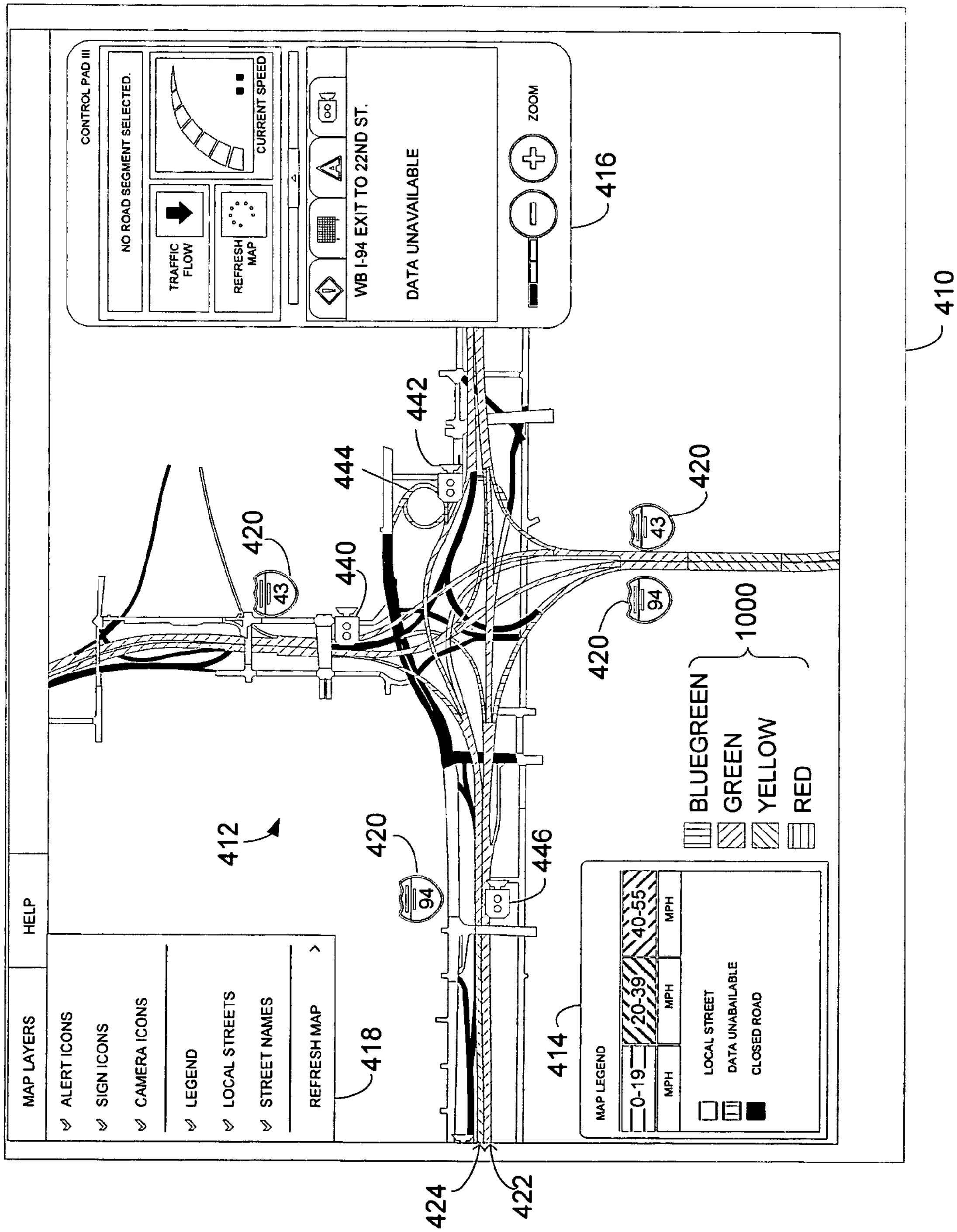
FIGS. 4A-4C depict various aspects of a dynamically updateable user interface in accordance with an embodiment of the present invention.

For instance, continuing with the traffic example, a user may opt to define a segment composed of constituent polygons that share common traits. For example an exit ramp may be composed of various polygons, but those polygons can be grouped together to form a single segment, such that varying characteristics associated with the exit ramp as a whole can be conveyed to a viewer of what will become the dynamically updateable user interface (as can be seen in FIG. 4A). Any number of things can be grouped together as desired. Another illustrative logical grouping is routes from segments.

As further shown in screenshot 368, a "route manager" selection option 372 is shown as available from the "create" menu 374. Selecting option 372 presents the user with a dialog window as shown in screenshot 376 of FIG. 3N. Various available segments in a first box 378 are shown and can be selected to be logically grouped in a second box 380. The two segments will not be joined to form a route. Here again, those skilled in the art will appreciate still more functional aspects of the present invention. For example during many construction projects the public is to somehow be kept informed of the status of various aspects of the project.

Consider an example where a major section of roadway is to be worked on. In such a section, large numbers of factors will be involved with the project. It may even be the case that certain segments of roadways, such as interstates, may span multiple states, cities, counties, or other regions. If one method for keeping the public informed of changes is to e-mail a list of periodic updates to certain interested stakeholders, such as general members of the public, then it would be advantageous for those stakeholders to be informed only about situations that are comparatively more relevant to them.

For example, it may be the case that it is desirable that residents of a certain state be kept abreast only of changes that are implicated in that state or region and not other states with which this group of people may not be concerned. If this is the case, then a route can be defined accordingly, by constituent segments that reside only in a certain state. With the segments logically grouped into a route according to geographic information, when a change occurs to the route, citizens associated with the same geographic area as the route can be updated while citizens not associated with that common geographic region can be spared the undesired information. Similarly, users may wish to indicate that they are interested in a certain route. Having received this indication, information associated with that route can be communicated to that citizen or group of citizens. Any number of groupings can be facilitated by the present invention.

Dynamically Updating User Interface

As previously mentioned, construction projects can impact a community in a variety of ways. For example, while a new building is being built, or while roadway modifications are being made, various streets may need to be shut down, traffic otherwise rerouted, or various other changes may need to be made. Keeping the public informed about information that will affect them is a major goal of one or more entities. "The public" can actually include a variety of people or organizations, including private businesses, organizations, etc., which herein will be collectively referred to as "stakeholders."

It is desirous to keep stakeholders informed as to the status of changes that affect them and of the progress of one or more projects to be completed. This can be done by presenting a dynamically updatable user interface, such as user interface 122 of FIG. 1, as described above. Having associated a set of attributes (typically a complex set of attributes) with the various objects of redrawn map 115, object-rendering data 118 that describes such objects and attributes can be exported to database 120.

With this relational data 118 available in database 120, it can be referenced as source data to draw a dynamically updateable user interface. An illustrative dynamically updateable user interface is depicted in FIG. 4A and referenced generally by the numeral 410. To illustrate various functional aspects of the present invention, a traffic-status situation has been selected as an example of keeping stakeholders aware of various aspects associated with a current status of traffic situations in a given geographic location. The status of the traffic situations may be related to a project that needs to be completed, or it may be used to depict data completely unassociated with a project of any sort.

User interface 410 depicts a traffic map that is referenced generally by the numeral 412. User interface 410 also includes a map legend 414 and a status window 416. Because the nature of patent applications do not contemplate the use of color, we denote an internal legend by numeral 1000 to indicate that it is not part of the present invention but will be useful in explaining various aspects of it.

Various control options are made available by a drop-down menu 418. As shown, traffic map 412 graphically depicts a real-world interchange. This interchange was initially drawn as a graphics file, such as graphics file 112, redrawn according to the methods described above to produce redrawn map 115 where attribute information can be associated with actual objects to develop object-rendering data, which is used to render traffic map 412 on user interface 410. Whereas the drawing of graphics file 112 is stagnant, traffic map 412 is not stagnant. Rather, traffic map 412 changes according to changes in the real world. From the actual map legend 414, it can be observed that some streets are closed, namely, those blacked out. Streets can be designated with signs such as the signs shown, referenced by numeral 420.

In one embodiment, user interface 410 is depicted on a network browser (including a web browser), such that it is widely available to anyone with Internet access. An illustrative component that can be used to render traffic map 412 according to an embodiment of the present invention includes the FLASH product offered by Macromedia, Inc. of San Francisco, Calif. Viewing the actual map legend 414 in connection with figure legend 1000, it can be seen that user interface 410 presents a wide array of data to a viewer observing the map.

For instance, traffic map 414, as shown (for an example), indicates that traffic traveling an average of 0 to 19 miles per hour is illustrated on map 412 by a pathway colored red. Similarly, pathways with traffic moving on the order of 20 to 39 miles per hour are colored yellow, and pathways with traffic traveling about 40 to 55 miles per hour is colored green. Each of these colors is designated by a respective hash pattern, shown by drawing legend 1000. For example, pathway 422 includes traffic whose average speed is approximately 40 to 55 miles per hour because it is shaded green (diagonal left hashing). Similarly, pathway 424 is indicated as being colored yellow, which symbolizes traffic moving on the order of 20 to 39 miles per hour (right diagonal hashing). Of course, the scope of the present invention contemplates other sorts of display-characteristic notations besides color. Color is merely illustrative.

Figure 4B:
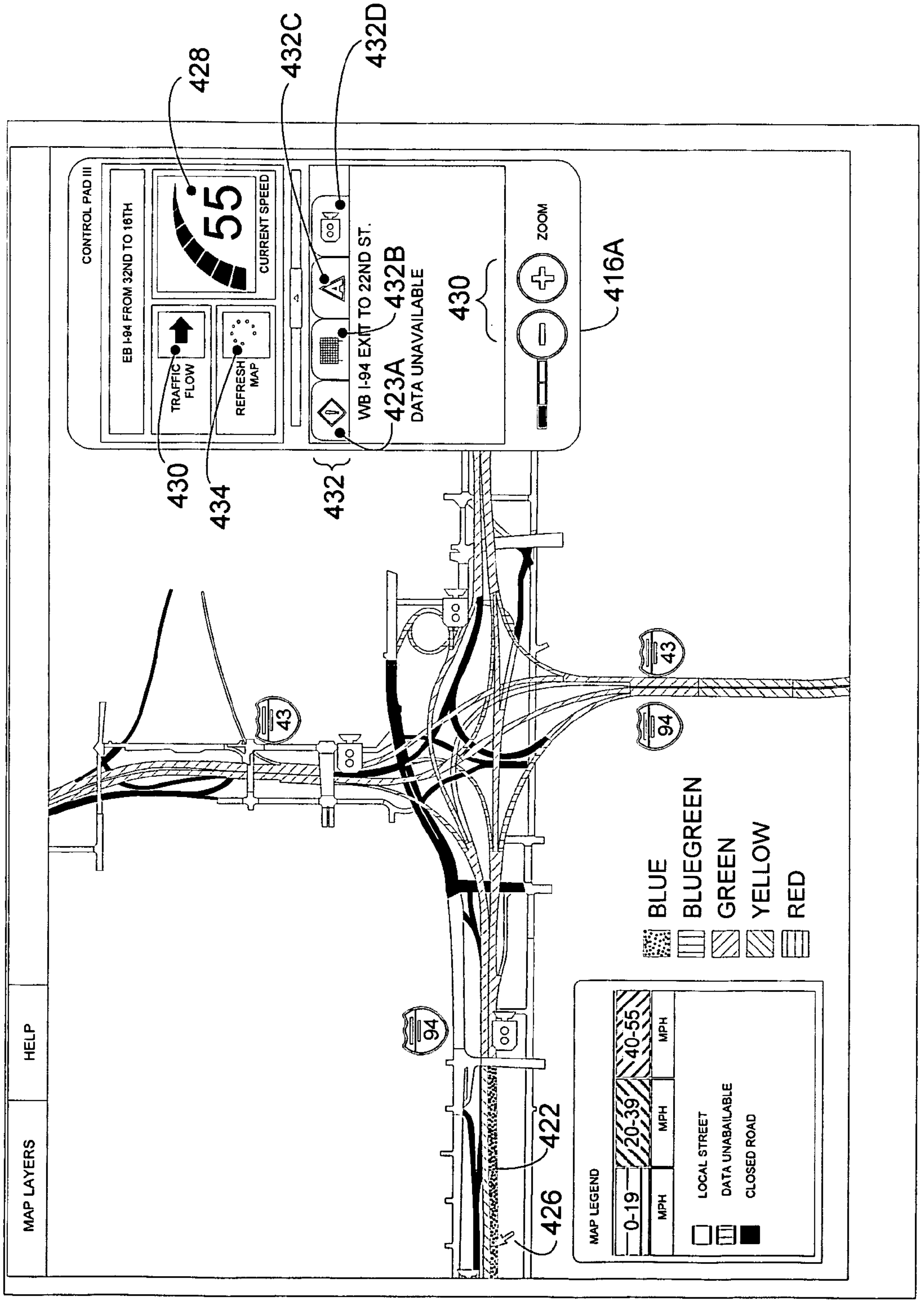
Figure 4C:
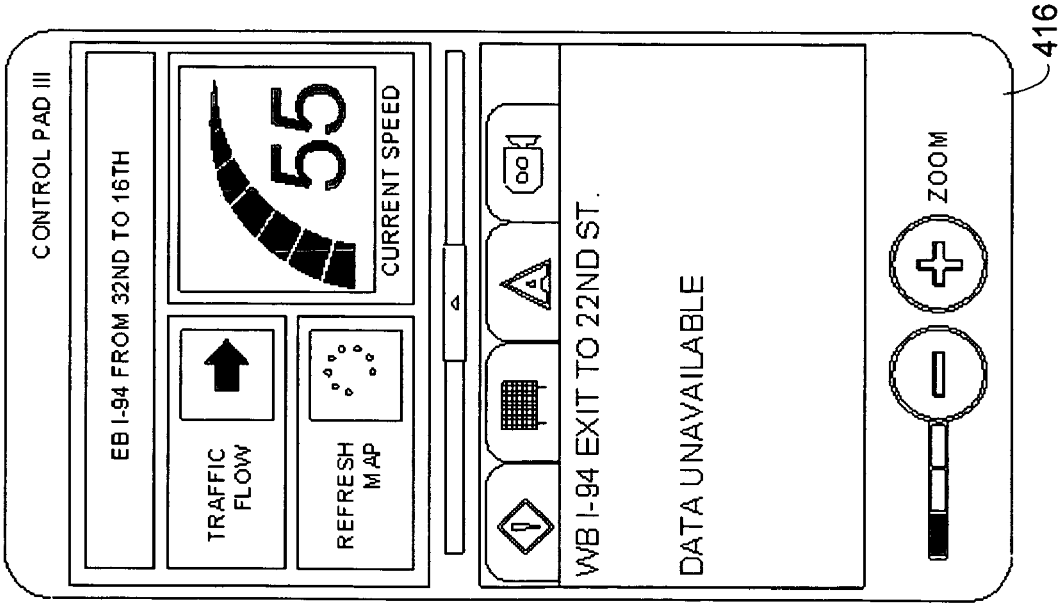

When a user drags the cursor to hover over a display object, its characteristics can change to provide feedback or additional information associated with the link. For example, if a user were to hover over pathway 422, as indicated in FIG. 4B by cursor 426, then the color of pathway 422 changes from green to blue, and also triggers additional information to be displayed in control pad 416, referred to as 416A in FIG. 4B for clarity (see also FIG. 4C). As shown, control pad 416A illustrates that the actual current speed of traffic in pathway 422 is 55 miles per hour, as indicated by the "current speed" control 428. Control pad 416A also indicates that traffic flow is in an easterly direction by "traffic flow" indicator 430. Control pad 416A allows a user to zoom in using zoom controls 430, or select from a group of tabs 432 to view specific types of information, such as hazards or closings 432A, sign indications 432B, street-name indications (tab 432C), or data from various camera locations via tab 432D. Clearly, it would be impractical to attempt to describe the array of information that could be conveyed. But those skilled in the art will appreciate the wide applicability incident to reading this disclosure coupled with the prior art. The map can be refreshed automatically or manually by selecting the refresh control 434.

Returning to FIG. 4A, if a user wanted more information associated with a camera such as that of camera 440, then selecting camera 440 would present such additional information (such as a real-time photo or video stream). As can be seen, a vast amount of information associated with real-world situations, here illustratively depicted as a traffic situation, can be presented to a user. In this example of a traffic setting, various information associated with aspects of traffic data can be depicted; for example, data relating to traffic volume, traffic occupancy, traffic-speed ranges, actual speeds of vehicles including averages of groups of vehicles, location-specific data, traffic-status images, text from variable-message signs, construction phasing, closure schedules, indications of events, alerts, and combinations thereof. A user may pan and zoom using the cursor to either grab the map or select the zoom buttons 430.

Embodiments of the present invention address an array of problems. One of the problems addressed by the present invention is that of updating user interface 410 according to changes in the structures to which it corresponds. For example, consider the situation when a structure is to be removed. For example, assume an exit ramp 444 is removed. A potentially difficult problem is updating traffic map 412 to be consistent with the corresponding changes in the real world.

But according to the methods described above, such change(s) can be made in stagnant graphics file 112, which is used to update a redrawn map (which can be configured to search only for differences between its current status and the status of graphics file 112), which outputs new object-rendering data 118, which is then used to automatically redraw traffic map 412 without user intervention.

This is a significant leap forward in that time- and resource-intensive procedures can be foregone in exchange for a simple process to update traffic map 412 in accordance with graphics file 112, which was changed to reflect a change in the real world. A more detailed example associated with updating traffic map 412 according to one embodiment of the present invention will now be given with reference to FIG. 5.

Figure 5:
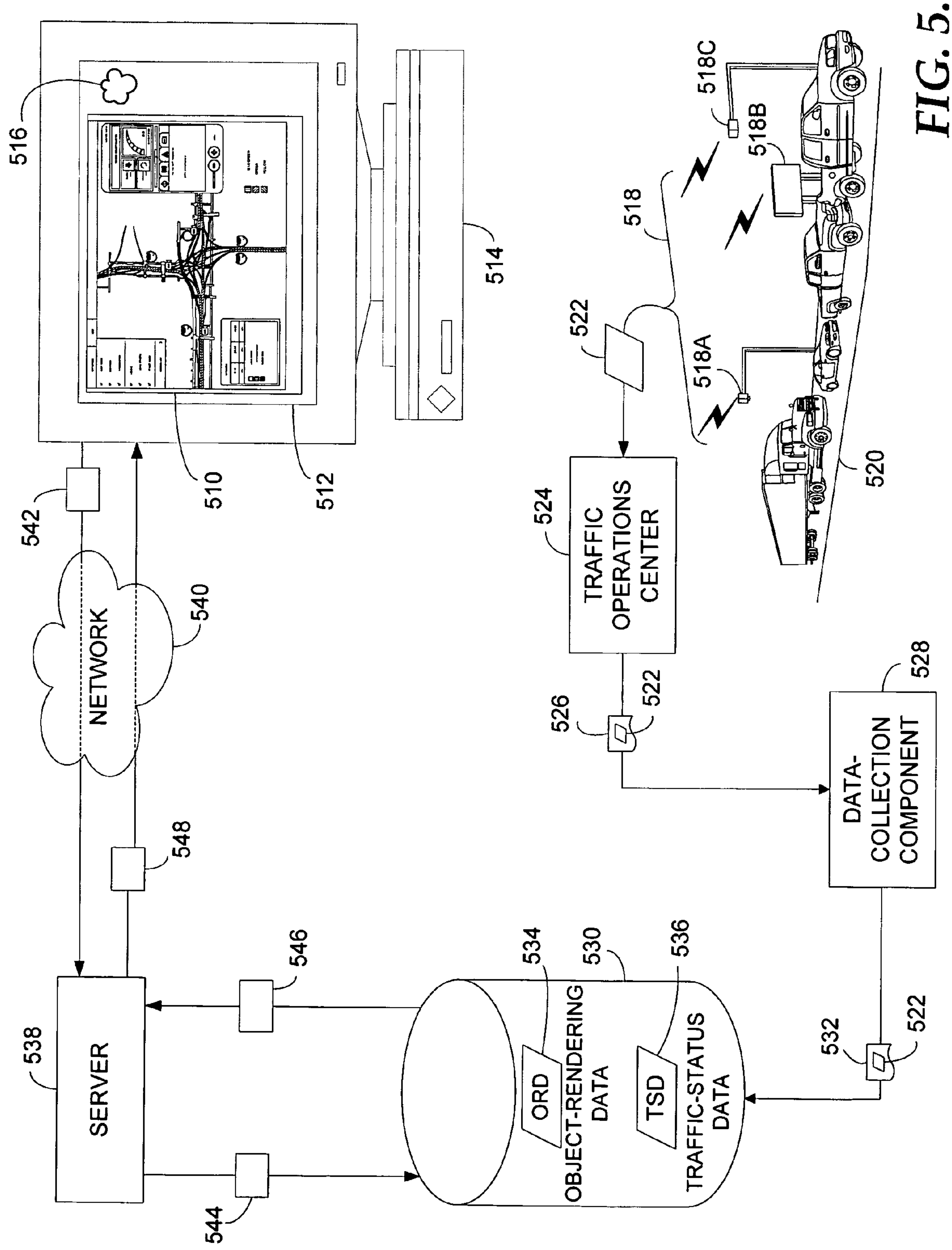
FIG. 5 is a combination block/flow diagram depicting a method for dynamically updating a user consistent with happenings in the real world in accordance with an embodiment of the present invention.

Turning to FIG. 5, a combination block/flow diagram depicts aspects of dynamically updating user interface 510 (which can be correspondent to user interface 410). User interface 510 is presented on a screen 512 of a computing device 514 that runs an application 416 to present user interface 512. Traffic-gathering devices are shown as collectively referenced by numeral 518, and individually referenced by numerals 518A, 518B, and 518C. These devices 518, and potentially many, many more, gather real-world traffic information associated with a given traffic situation, illustratively referenced by numeral 520.

Device 518 may, for example, gather speed data associated with traffic 520. Device 518B may be a variable-message sign that presents information to traffic users. 518C may be a camera that communicates still pictures or live video feeds from a location associated with traffic situation 520. Those skilled in the art will appreciate that many more tens, hundreds, or thousands of devices and types of devices could also be used to gather other aspects of traffic data. These other devices are not shown so as to not obscure the present invention but are clearly contemplated in this disclosure.

Situational data 522 is gathered from traffic-status devices 518 and communicated to a traffic operations center 524. In one embodiment, traffic data 522 is wrapped in a file 526 that is sent to a data-collection component 528. In some embodiments, data 522 may be sent directly to data-collection component 528 or to a database 530, which may be the same database as that shown in FIG. 1. But in this embodiment the components are shown separated to facilitate a more detailed explanation of at least one embodiment of the present invention. Data collection component 528 collects traffic data 522, and may also communicate the data 522 via a file 532 to database 530, which already includes object-rendering data 534 (which was first introduced in connection with FIG. 1). Accordingly, database 530 is populated with both object-rendering data 534 as well as traffic-status data 536, which was derived from traffic data 522. In some embodiments, traffic-status data 536 is identical to traffic data 522.

Database 530 is coupled to a server 538, which is directly or indirectly coupled to computer 514 via a network such as the Internet 540. Network 540 does not need to be the Internet. It could be any network that couples server 538 to computing device 514. Server 538 facilitates communication between computer 514 and database 530. In some embodiments, database 530 may reside within server 538. Although server 538 is referred to as a "server," it should be noted that various computing devices are contemplated within the scope of "server" such as a workstation, handheld device, etc. Communication can be facilitated via a push or a pull method.

In one embodiment, application 516 makes a request 542 that is communicated to server 538 to determine whether any changes to object-rendering data 534 or traffic-status data 536 has occurred. Server 538 passes a request 544 consistent with request 542 to database 530, which is queried to determine if any changes exist. A description of changes 546 is sent to server 538, which passes information 548 consistent with changes 546 to application 516, which updates user interface 510.

Thus, if an exit ramp were coincidentally removed at the same time speed-measuring device 518A registered a sufficient increase in speed, then database 530 would directly or indirectly be queried by application 516 to determine changes in object-rendering data 534 and traffic-status data 536. Such changes would be noted and communicated to application 516, which would both update the geometry of traffic map 412 on user interface 510 and the corresponding display characteristic of the object that displays the speed determined by device 518A. Again, traffic-status devices 518 may include an array of options, such as occupancy (percentage of lane fills), closures, dead links (no data), etc. Thus, according to the aforementioned methods, the geometry of traffic map 412 is tied to geometry information in graphics file 110.

The system of FIG. 5 can process and display a full range of real-time traffic data within graphical user interface 510 (which may include multiple screens), and provides messaging utilities for notification services, including subscription-based services. As previously mentioned, there are many different forms of traffic and roadway data, including: traffic speed and performance data gathered from roadway sensors 518A; video from traffic cameras 518C; data, such as incidents, road closures or construction and detour information, from traffic operations center databases; computer-assisted dispatch data from law enforcement agencies; audio from highway advisory radio; road condition and weather data from roadway weather information systems; text from dynamic message signs such as 518B; and roadway geometry from graphics files such as 112.

All of these data forms can be reduced to digital data, such as XML data streams, vector data, MP3 and MPEG files, and ultimately depicted on user interface 512. The traffic map's data engine 538 converts digital traffic-related data from any specified server into a display in interface 512. Traffic speed ranges on roadway segments can be indicated with different colors or other indications. Actual speeds can be displayed on control pad 416 (see also FIG. 4C) when the user directs their cursor to a segment or by some other means (keyboard entry, touch-screen tap, etc.).

Icons indicate available, location-specific data for incidents, traffic camera images, and text from variable message signs. Users can adjust magnification with buttons 430 on control pad 416A or move the map by dragging it with their mouse.

Roadway geometry can be processed from CAD files 112 through graphics mapping component 116, remains vector-based; and is generated on the fly by data engine 538 as geometry and alignments change with construction phasing. Construction phasing, closure schedules, and alerts can all be presented in a text or other format that meets government accessibility standards.

Embodiments of the present invention can also be used in connection with other forms of public-information delivery, such as telematics, or applications that include vehicle-based electronic systems, mobile telephony, vehicle tracking and positioning, on-line navigation and information services and emergency assistance. Alternative static applications include stock control (automatic ordering), and monitoring of utilities meters.

Other delivery methods include public interfact for smart work zones—a solution providing detection and monitoring, communications infrastructure, dynamic message signs, video cam images, video clips, etc. Embodiments of the present invention can also be configured to work with emergency notification systems—general purpose alerting tools generating alerts based on client business rules and interface 512 or other services for PDA's.

As mentioned, embodiments of the present invention can process and display real-time traffic data via the Internet within a graphical interface in graphical or text form. It can depict HAR, video-camera images, Roadway Weather Information System (RWIS) data, traffic performance data from roadway sensors, or text from variable message signs. Data streams can be translated from traffic operations centers 524 and other information that can be delivered to the system digitally or in XML. Real-time data can be extracted from databases, such as database 530 (or 120) and digital audio and video sources. The present invention can display traffic incident data drawn from law-enforcement CAD (Computer Assisted Dispatch) systems, automatically or with a "review and approval" layer. Geometry can be generated on the fly from a database for use in visual mapping and communications. Alternative embodiments could extract geometry data directly from a geospatial database working with GIS (Global Information System). The translation process of pulling vector geometry from CAD programs is simplified, and converting it to a visual online vector format can be done automatically.

Smart work zone solutions to manage roadway performance detection can be provided along with dynamic message signs, video-camera images; or video clips. The user experience is enhanced with rich media-style maps that clarify the results of map interaction with a portable data control pad. Traveler information can be distributed to cell phones, e-mail, messaging devices, etc.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-useable instructions embodied thereon for performing a method of presenting real-world situational data on a system-independent, dynamically updateable user interface, the method comprising:

- receiving information from a vector based computer aided drafting graphics file that depicts a drawing comprising display objects which correspond to real-world objects that have variable display characteristics, wherein the display objects describe roadway geometry;
- rendering a set of definable objects that are situated to resemble the roadway geometry using coordinate geometry information from the graphics file without user intervention;
- associating one or more attributes with the set of definable objects to obtain object rendering data;
- providing a dynamically updateable user interface that includes one or more dynamic objects that are useable to reflect real-world events, wherein the dynamic objects are associated with one or more variable characteristics, and wherein the dynamic objects are depicted on a map that is generated from the object-rendering data that, if updated, automatically results in said dynamic object being updated consistent therewith;
- receiving situational data that corresponds to a status of the real-world events, said situational data derived from one or more components, said components comprising law enforcement agencies, weather information systems, dynamic message signs, and publicly displayed sensors and cameras;
- conforming the one or more variable characteristics to be consistent with the situational data such that an observer of the one or more dynamic objects is informed of a current status corresponding to a real-world situation; and
- utilizing a route manager with the dynamically updateable user interface to perform a segment assembly process that includes,
  - (1) providing at least one route, said at least one route comprising a plurality of segments, wherein each of said plurality of segments comprises a plurality of polygons;
  - (2) receiving at least one designated real world characteristic pertinent to said at least one route;
  - (3) selecting a region within an area encompassing said at least one route, wherein said region comprises some of said plurality of segments and some of said plurality of polygons, and wherein said selecting a region is based upon said at least one designated real world characteristic; and
  - (4) notifying participating users of any changes to said region, based upon said at least one designated real world characteristic;
  - (5) wherein each of said plurality of segments share a common map-related trait, and each of said plurality of polygons within a respective segment share a common map-related trait.

2. The media of claim 1, wherein the object-rendering data is used to draw the map based on drawing information in the graphics file that correspond to real-world objects and wherein the situational data includes traffic data.

3. The media of claim 2, wherein the traffic data includes roadway data comprising one or more of:

- traffic speed;
- performance data gathered from one or more roadway sensors;
- video from one or more traffic cameras;
- incident data;
- road closures;
- construction information;
- detour information;
- traffic operations data from databases;
- dispatch data including computer-assisted dispatch data from one or more law enforcement agencies;
- audio information including audio information from highway advisory radio(s);
- road-condition information;
- weather data;
- location-specific data;
- text from one or more dynamic message signs; and
- roadway geometry.

4. The media of claim 1, wherein the dynamically updateable user interface includes a system-independent interface that includes one or more information-depiction components.

5. The media of claim 4, wherein the one or more dynamic objects includes groupings of one or more constituent objects.

6. The media of claim 5, wherein the one or more variable characteristics includes variable visual characteristics and/or audio characteristics.

7. The media of claim 6, wherein the visual characteristics include one or more of a color, a fill pattern, a blinking status, and a texture.

8. The media of claim 6, wherein conforming includes updating the dynamically updateable user interface to reflect a change in the situational data and/or to reflect a change in the coordinate geometry information associated with the dynamic objects presented on the dynamically updateable user interface.

9. The media of claim 8, further comprising generating one or more alerts associated with the situational data.

10. The media of claim 9, further comprising communicating the one or more alerts to one or more remote devices.

11. The media of claim 10, wherein the one or more remote devices includes a mobile phone, an e-mail-receiving device, a television, a radio, and/or a personal data assistant.

12. One or more computer-readable media having computer-executable instructions embodied thereon that, when executed, cause a computing device to perform a method for presenting real-world situational data on a dynamically updateable user interface, the method comprising:

- receiving information from a vector based computer aided drafting graphics file that depicts a drawing comprising display objects which correspond to real-world objects that have variable display characteristics, wherein the display objects describe roadway geometry;
- providing a redrawn map comprising one or more definable objects that are situated to resemble the roadway geometry using coordinate geometry information from the graphics file without user intervention;

associating one or more attributes with the definable objects to obtain object rendering data;

storing in a repository, the object-rendering data that describes how to render the redrawn map that includes the one or more definable objects into a dynamically updateable user interface containing one or more dynamic objects associated with one or more variable characteristics, wherein said object-rendering data is generated from drawing information that describes real-world objects that are ultimately depicted on said dynamically updateable user interface, and wherein a change in said object rendering data gives rise to an automatic change in said dynamically updateable user interface;

receiving from one or more traffic-data gathering components traffic data that describes a status of a real-world, traffic-related situation, said traffic-data gathering components comprising roadway sensors, video traffic cameras, dispatch data from law enforcement agencies, weather information systems, and dynamic message signs;

communicating the traffic data to the graphics file;

causing the one or more variable characteristics respectively associated with the one or more dynamic objects to graphically indicate the status of the current traffic-related situation;

without user interaction, periodically determining whether the object-rendering data in the repository has changed from a previous state to subsequent state, and if so, automatically re-depicting the dynamic objects consistent with the subsequent state;

utilizing the dynamically updateable user interface to provide at least one route, said at least one route comprising a plurality of segments, wherein each of said plurality of segments comprises a plurality of polygons;

receiving at least one designated real world characteristic pertinent to said at least one route;

selecting a region within an area encompassing said at least one route, wherein said region comprises some of said plurality of segments and some of said plurality of polygons, and wherein said selecting a region is based upon said at least one designated real world characteristic; and displaying said real world events for said selected region and said designated real world characteristic to said user interface.

13. The method of claim 12, wherein the repository stores coordinate-geometry information and traffic-status information.

14. The method of claim 13, wherein the object-rendering data that describes how to render the dynamic objects includes information relating to how to draw a representation of objects associated with the real-world situational data.

15. The method of claim 14, wherein communicating the traffic data includes one or more of the following:

communicating the traffic data directly to the one or more dynamic objects; or communicating the traffic data indirectly through a repository.

16. The method of claim 14, wherein communicating the traffic data includes communicating the traffic data according to a push or pull model.

17. The method of claim 12, wherein periodically determining includes determining on an irregular schedule and based upon an occurrence of one or more events.

18. The method of claim 12, wherein the re-depicting includes automatically redrawing the dynamic objects according to one or more changes associated with the subsequent state.

19. One or more computer-storage media having computer-useable instructions embodied thereon that, when executed, cause a computing device to perform a method for presenting real-world situational data on a dynamically updateable user interface, the method comprising:

creating a dynamically updateable user interface (UI) that includes a map being presented by way of a web browser, wherein said map includes mapping information from a vector based computer aided drafting graphics file that includes static objects representing roadway geometry as well as depictions of dynamic objects that correspond to the attribute-receivable objects and that are associated with one or more variable characteristics;

receiving situational data;

conforming the one or more variable characteristics incident to receiving situational data;

receiving an indication that object-rendering data has changed, the object rendering data being useable to draw said map including said static objects, and the object-rendering data stemming from drawing information that describes real-world objects;

automatically updating said map incident to receiving said indication that said object-rendering data has changed;

utilizing the dynamically updateable UI to provide at least one route, said at least one route divided into a plurality of segments, and each of said plurality of segments further divided into a plurality of polygons, wherein each of said plurality of segments share a common map-related trait, and each of said plurality of polygons within a respective segment share a common map-related trait, wherein the map-related trait of the plurality of segments differs from the map-related trait of the plurality of polygons; and selecting a region within an area encompassing said at least one route, wherein said region comprises some of said plurality of segments and some of said plurality of polygons, and wherein said selecting a region is based upon at least one designated real world characteristic.

20. The media of claim 19, wherein creating the dynamically updateable UI includes:

providing one or more drawing files that include drawing data that describes stagnant-drawing objects of the stagnant drawing;

using the drawing data, presenting a redrawn map with a set of attribute-receivable objects that are consistent with the drawing data;

exposing a set of options to associate attributes with the attribute-receivable objects; and associating the attributes with the attribute-receivable objects.

21. One or more computer-readable media having computer-executable instructions embodied thereon that, when executed, cause a computing device to perform a method for presenting traffic-related information, the method comprising:

gathering a plurality of informational attributes associated with traffic conditions of a geographic area;

receiving an indication that object-rendering data has changed, the object rendering data being usable to draw a map including static objects representing roadway geometry, and the object-rendering data stemming from drawing information from a vector based computer aided drafting graphics file that describes real-world objects;

representing the informational attributes on a graphical user interface of an e-mail or messaging device;

utilizing a dynamically updateable user interface to provide at least one route, said at least one route divided into a plurality of segments, and each of said plurality of segments further divided into a plurality of polygons, wherein each of said plurality of segments share a common map-related trait, and each of said plurality of polygons share a common map-related trait;

selecting a region within an area encompassing said at least one route, wherein said region comprises some of said plurality of segments and some of said plurality of polygons, and wherein said selecting a region is based upon at least one designated real world characteristic; and displaying real world events for said selected region and said at least one designated real world characteristic to said graphical user interface.

22. The media of claim 21, wherein the plurality of informational attributes includes one or more selections from the following:

traffic volume;

traffic occupancy, traffic speed ranges;

actual speeds of vehicles including averages of groups of vehicles;

location-specific data;

traffic-status images;

text from variable-message signs;

construction phasing;

closure schedules;

indications of events;

alerts; and combinations thereof.

* * * * *